(12) United States Patent
Miller, II et al.

(10) Patent No.: US 10,823,835 B2
(45) Date of Patent: Nov. 3, 2020

(54) ELECTROMAGNETIC REFLECTION PROFILES

(71) Applicant: AT&T Intellectual Property I, L.P., Atlanta, GA (US)

(72) Inventors: Robert Raymond Miller, II, Convent Station, NJ (US); Kevin A. Li, New York, NY (US); Troy C. Meuninck, Newnan, GA (US); James H. Pratt, Round Rock, TX (US); Horst J. Schroeter, New Providence, NJ (US); Behzad Shahraray, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/509,832

(22) Filed: Jul. 12, 2019

(65) Prior Publication Data

US 2019/0339375 A1 Nov. 7, 2019

Related U.S. Application Data

(63) Continuation of application No. 15/867,797, filed on Jan. 11, 2018, now Pat. No. 10,393,868, which is a continuation of application No. 14/886,004, filed on Oct. 17, 2015, now Pat. No. 9,874,632, which is a continuation of application No. 13/685,741, filed on Nov. 27, 2012, now Pat. No. 9,188,668.

(51) Int. Cl.
*G01S 13/46* (2006.01)
*G01S 13/06* (2006.01)
*G01S 5/02* (2010.01)

(52) U.S. Cl.
CPC ............ *G01S 13/46* (2013.01); *G01S 5/0252* (2013.01); *G01S 13/06* (2013.01); *G01S 2013/462* (2013.01)

(58) Field of Classification Search
CPC .... G01S 5/0036; G01S 5/0236; G01S 5/0252; G01S 5/0273; G01S 13/46; G01S 13/06; G01S 2013/462; H04W 4/028; H04W 4/02; H04W 48/04; H04W 64/00
See application file for complete search history.

(56) References Cited

U.S. PATENT DOCUMENTS

| | | |
|---|---|---|
| 5,420,910 A | 5/1995 | Rudokas et al. |
| 5,893,031 A | 4/1999 | Hoogerwerf et al. |
| 5,959,577 A | 9/1999 | Fan et al. |
| 6,023,619 A | 2/2000 | Kaminsky |
| 6,104,922 A | 8/2000 | Baumann |
| 6,904,269 B1 | 6/2005 | Deshpande et al. |
| 6,978,023 B2 | 12/2005 | Dacosta |
| 7,068,998 B2 | 6/2006 | Zavidniak |
| 7,415,613 B2 | 8/2008 | Impson et al. |
| 7,677,438 B2 | 3/2010 | DeJean et al. |
| 7,844,252 B2 | 11/2010 | Hodge |

(Continued)

*Primary Examiner* — Aristocratis Fotakis
(74) *Attorney, Agent, or Firm* — Guntin & Gust, PLC; Robert Gingher

(57) ABSTRACT

Methods, systems, and products determine electromagnetic reflective characteristics of ambient environments. A wireless communications device sends a cellular impulse and receives reflections of the cellular impulse. The cellular impulse and the reflections of the cellular impulse may be compared to determine the electromagnetic reflective characteristics of an ambient environment.

20 Claims, 33 Drawing Sheets

(56) References Cited

U.S. PATENT DOCUMENTS

| | | |
|---|---|---|
| 8,069,166 B2 | 11/2011 | Alvarado et al. |
| 2002/0175855 A1 | 11/2002 | Richton |
| 2004/0209602 A1 | 10/2004 | Joyce |
| 2004/0214557 A1 | 10/2004 | Liao |
| 2005/0012611 A1 | 1/2005 | Osman |
| 2006/0046709 A1 | 3/2006 | Krumm |
| 2006/0217130 A1 | 9/2006 | Rowitch |
| 2007/0046530 A1 | 3/2007 | Fedora |
| 2007/0121560 A1 | 5/2007 | Edge |
| 2007/0159378 A1 | 7/2007 | Powers et al. |
| 2008/0122689 A1 | 5/2008 | Hoshino et al. |
| 2008/0129598 A1 | 6/2008 | Godefroy |
| 2008/0139217 A1 | 6/2008 | Alizadeh-Shabdiz et al. |
| 2008/0143482 A1 | 6/2008 | Shoarinejad |
| 2008/0214161 A1 | 9/2008 | Jakl |
| 2008/0242418 A1 | 10/2008 | Theimer et al. |
| 2008/0248822 A1* | 10/2008 | Jarvinen ............... H04L 1/0001 455/509 |
| 2010/0007552 A1 | 1/2010 | Oda et al. |
| 2010/0088181 A1 | 4/2010 | Crolley et al. |
| 2010/0135178 A1 | 6/2010 | Aggarwal et al. |
| 2010/0309051 A1* | 12/2010 | Moshfeghi ............ H04W 4/029 342/378 |
| 2010/0317366 A1 | 12/2010 | Shen et al. |
| 2010/0317371 A1 | 12/2010 | Westerinen et al. |
| 2011/0035284 A1* | 2/2011 | Moshfeghi ............ G06Q 30/02 705/14.58 |
| 2011/0045840 A1 | 2/2011 | Alizadeh-Shabdiz et al. |
| 2011/0163955 A1 | 7/2011 | Nasiri et al. |
| 2011/0273300 A1 | 11/2011 | Brommer et al. |
| 2012/0084839 A1 | 4/2012 | Ayyagari et al. |
| 2012/0119949 A1* | 5/2012 | Takahashi ............... G01S 19/46 342/357.29 |
| 2012/0149390 A1 | 6/2012 | Gravely |
| 2012/0188929 A1 | 7/2012 | Zhang et al. |
| 2012/0214507 A1 | 8/2012 | Vertanian et al. |
| 2013/0010112 A1 | 1/2013 | Goto et al. |
| 2013/0029685 A1 | 1/2013 | Moshfeghi |
| 2013/0029686 A1 | 1/2013 | Moshfeghi |
| 2013/0064197 A1 | 3/2013 | Novak |
| 2013/0176161 A1 | 7/2013 | Derham et al. |
| 2013/0229303 A1 | 9/2013 | Marshall |
| 2013/0260798 A1* | 10/2013 | Moshfeghi ............ H04W 4/025 455/456.5 |
| 2013/0288706 A1 | 10/2013 | Yu |
| 2013/0310068 A1 | 11/2013 | Fischer |
| 2014/0349671 A1 | 11/2014 | Lakhzouri |
| 2014/0357296 A1* | 12/2014 | Deng .................... H04W 64/00 455/456.1 |
| 2015/0087329 A1* | 3/2015 | Stratford ................ G01S 5/021 455/456.1 |
| 2015/0172872 A1* | 6/2015 | Alsehly .................. H04W 4/33 455/457 |

* cited by examiner

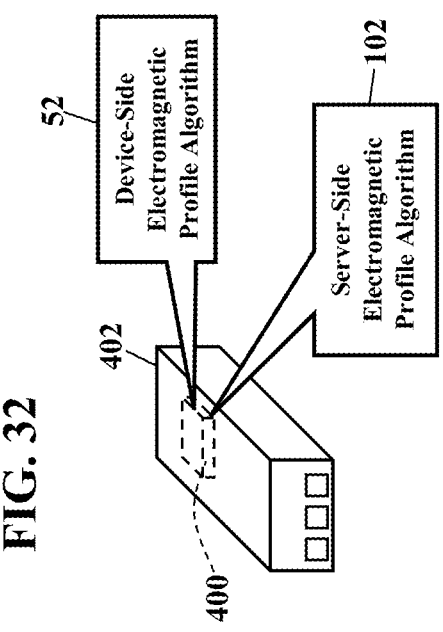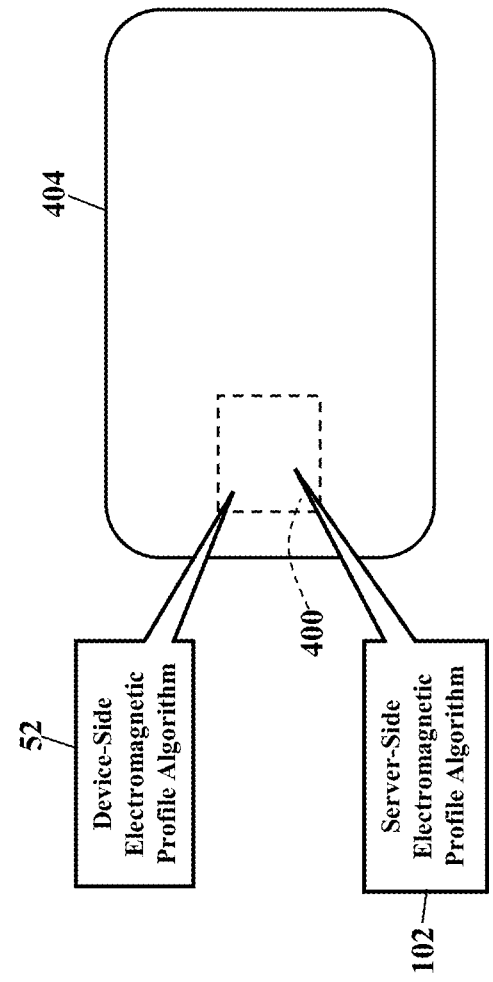

ELECTROMAGNETIC REFLECTION PROFILES

CROSS-REFERENCE TO RELATED APPLICATIONS

This application is a continuation of U.S. application Ser. No. 15/867,797 filed Jan. 11, 2018 and since issued as U.S. Pat. No. 10,393,868, which is a continuation of U.S. application Ser. No. 14/886,004 filed Oct. 17, 2015 and since issued as U.S. Pat. No. 9,874,632, which is a continuation of U.S. application Ser. No. 13/685,741 filed Nov. 27, 2012 and since issued as U.S. Pat. No. 9,188,668, with all applications incorporated herein by reference in their entireties.

BACKGROUND

Mobile communications has revolutionized society. Data access is available to anyone on the go. People will embrace advances that further improve mobile communications.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 29-34 depict still more operating environments for additional aspects of the exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
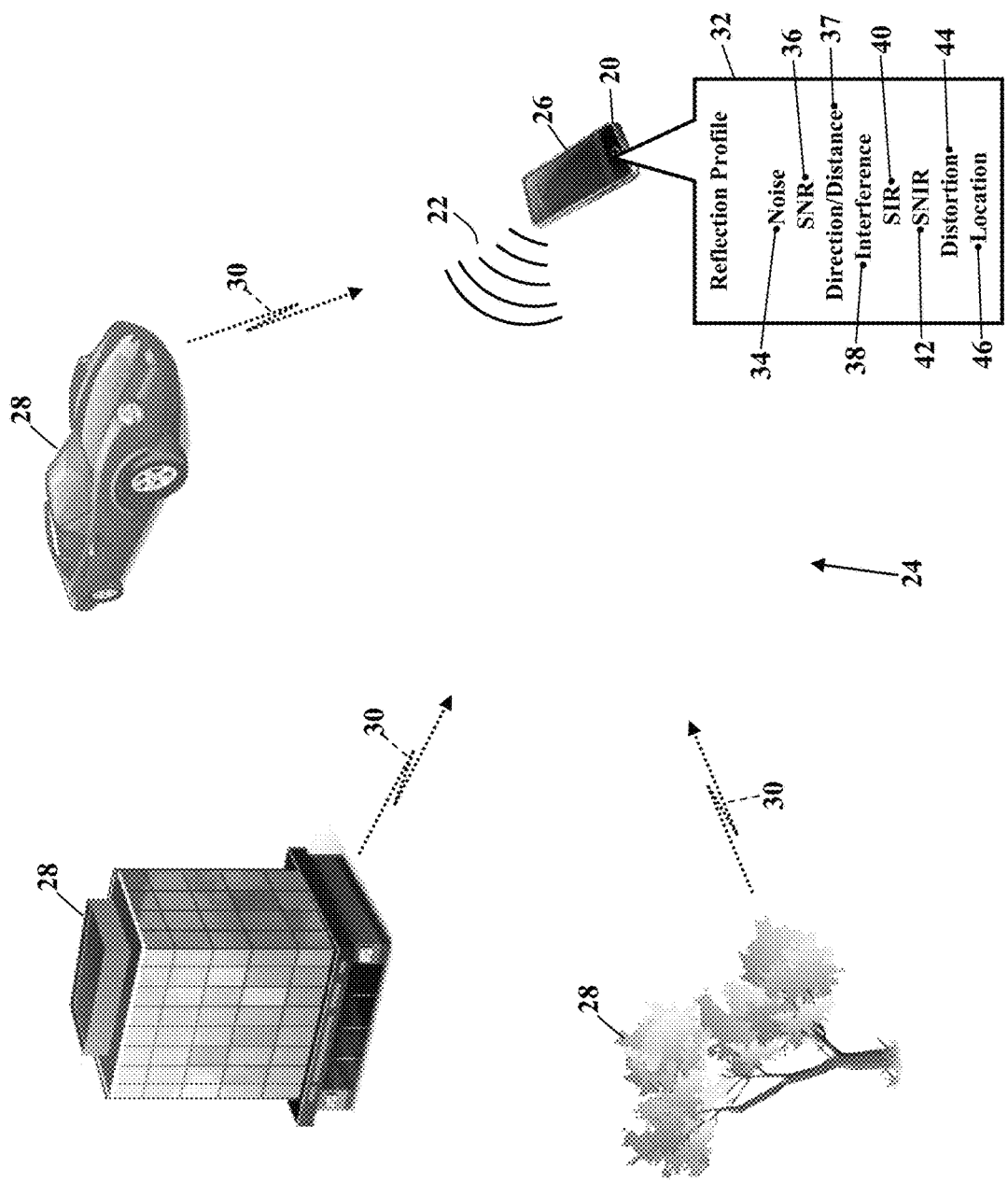
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a wireless communications device 20 transmitting a wireless signal 22 in an ambient environment 24. For simplicity, the communications device 20 is illustrated as a smart phone 26, which may transmit the wireless signal 22 in the radio-frequency range of the electromagnetic spectrum. Regardless, as the wireless signal 22 propagates within the ambient environment 24, the wireless signal 22 impinges on walls, buildings, and/or trees—whatever objects 28 lie within the ambient environment 24. One or more reflections 30 of the wireless signal 22 thus propagate back to the communications device 20. The communications device 20 may then analyze the reflections 30 to determine a reflection profile 32 of the ambient environment 24. The reflection profile 32 may thus describe the electromagnetic reflective characteristics of the ambient environment 24. The reflection profile 32, for example, may describe indoor electromagnetic reflective characteristics caused by interior walls and furniture in a home or office. The reflection profile 32, however, may also describe outdoor electromagnetic reflective characteristics caused by topographic features, buildings, and flora. Whether indoor or outdoor, the reflection profile 32 describes the electromagnetic reflective characteristics associated with the ambient environment 24.

The reflection profile 32 may also describe electromagnetic noise 34. As those of ordinary skill in the art understand, the ambient environment 24 may also include unwanted or undesirable electromagnetic disturbances. Some of the noise 34 may be due to natural sources, while some of the noise 34 is due to man-made sources. For example, the Earth is continually bombarded by electromagnetic energy from outer space. This natural source of the noise 34 may affect the electromagnetic characteristics associated with the ambient environment 24. Moreover, many other cell phones and computers may be operating within the same ambient environment 24. These man-made sources may also affect the electromagnetic characteristics associated with the ambient environment 24. Once the noise 34 is determined, a signal-to-noise ratio ("SNR") 36 may be determined for the ambient environment 24, along with a direction and distance 37 associated with the signal-to-noise ratio 36. The signal-to-noise ratio 36 may thus be used to improve transmissions to and from the wireless communications device 20.

The reflection profile 32 may also describe interference 38. As those of ordinary skill in the art understand, the ambient environment 24 may be subject to unwanted electromagnetic interference from other transmitters. This interference 38 may alter or affect the electromagnetic characteristics associated with the ambient environment 24. The interference 38, however, may also be caused by cross-talk signals and even deliberate "jamming" of signals. Once the interference 38 is known, a signal-to-interference ratio ("SIR") 40 may be determined for the ambient environment 24. A signal-to-noise plus interference ratio ("SNIR") 42 may also be determined. These ratios may also be used to improve transmissions to and from the wireless communications device 20.

Distortion 44 may be determined from the reflection profile 32. When the reflections 30 are compared to the originally-sent wireless signal 22, any of the reflections 30 may differ from the transmitted wireless signal 22. Any unwanted difference between the transmitted wireless signal 22 and the reflections 30 may be due to the distortion 44 caused by multipath arrivals. The distortion 44 may change the amplitude, phase, frequency, and/or any other feature of the transmitted wireless signal 22. Once the distortion 44 is known, the distortive effects of the ambient environment 24 may be applied to future transmissions to and from the wireless communications device 20.

The reflection profile 32 may thus be tied to the ambient environment 24. Now that the electromagnetic characteristics of the ambient environment 24 are known, the reflection profile 32 may be associated to a location 46. The location 46, for example, may be obtained from the communications device 20. The current location 46 of the communications device 20 may be obtained from a global positioning system ("GPS") and/or triangulation. The current location 46 may be mapped to the ambient environment 24 and/or to the reflection profile 32. Whenever the wireless communications device 20 again operates within the same location 46, the wireless communications device 20 may retrieve the reflection profile 32 for that same location 46. The reflection profile 32 may thus be applied to future signals sent and received in the same location 46. Moreover, the reflection profile 32 may be applied to other devices operating in the same location 46, as later paragraphs will explain.

Figure 2:
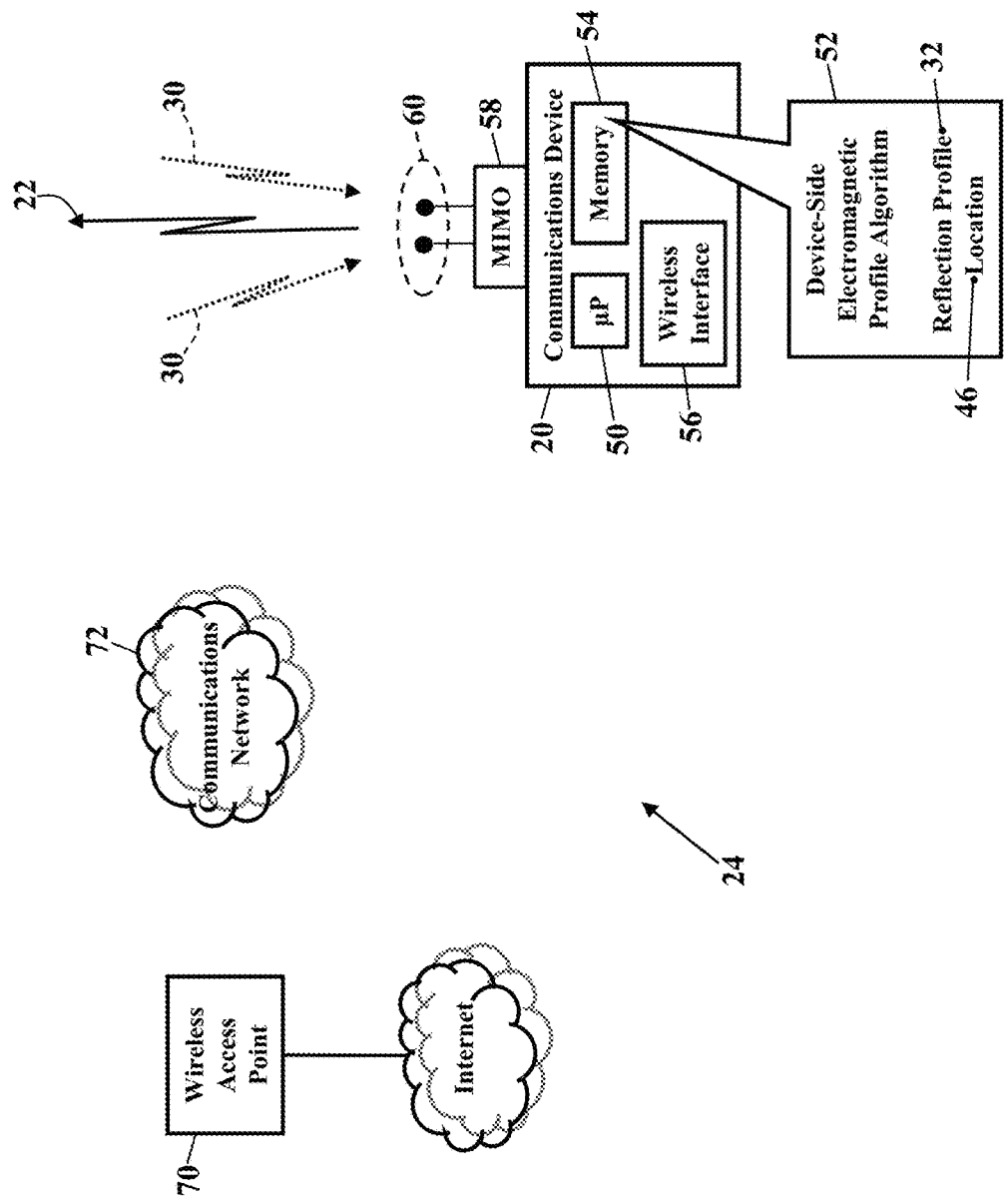
FIG. 2 is a more detailed schematic illustrating an operating environment, according to exemplary embodiments.

FIG. 2 is a more detailed schematic illustrating an operating environment, according to exemplary embodiments. The wireless communications device 20 may have a processor 50 (e.g., "μP"), application specific integrated circuit (ASIC), or other component that executes a device-side electromagnetic profile algorithm 52 stored in a local memory 54. The processor 50 may also instruct or command a wireless interface 56 to send the wireless signal 22. The wireless interface 56, for example, may be a transmitter, a receiver, and/or a combined transceiver. The wireless interface 56, however, may use any means of wireless transmission and/or reception of electromagnetic signals. While the wireless interface 56 may operate within any portion of the electromagnetic spectrum, the wireless interface conventionally tunes to, or operates within, the radio-frequency ("RF") range of the electromagnetic spectrum (such as a cellular telephony or data system).

The communications device 20 may have a multiple input, multiple output ("MIMO") system 58. The multiple input, multiple output system 58 interfaces with the wireless interface 56 and the processor 50 to send the wireless signal 22 and to receive the reflections 30. The multiple input, multiple output system 58, for example, may have one or more antennas 60 that may send and receive electromagnetic signals. FIG. 2, for simplicity, only illustrates two (2) antennas 60, but the communications device 20 may have several or many antennas. The processor 50 and the wireless interface 56 may cooperate to determine which of the multiple antennas 60 outputs electromagnetic signals. Likewise, when the multiple antennas 60 receive electromagnetic signals, the processor 50 and the wireless interface 56 may cooperate to determine which input is used. One or more of the multiple antennas 60 may thus be selected to optimize transmission and reception of electromagnetic signals.

MIMO, however, may not be required. Should the communications device 20 only have a directional antenna, exemplary embodiments may still be applied. Once a radio frequency (RF) profile of the directional antenna is known and stored, the RF profile may be coupled with knowledge of where the antenna is pointing when measurements are made (perhaps using an electronic compass or GPS fix). The reflections 30 obtained in such a case may represent a limited view of the surrounding ambient environment 24.

FIG. 2 also illustrates a wireless access point 70. The communications device 20 and the wireless access point 70 wirelessly communicate via a communications network 72. The wireless access point 70, for example, may be a conventional antenna, base station, router, or any other network device in a cellular network or WI-FI® network. The communications device 20 and the wireless access point 70 may communicate to access the Internet, as is known.

The reflection profile 32 improves services provided to the communications device 20. Because the reflection profile 32 may be location-based, the reflection profile 32 may be exploited for improving communications and data services to the wireless communications device 20. The reflection profile 32, for example, may be used to optimize configuration parameters in the multiple input, multiple output system 58. As the communications device 20 may have the multiple antennas 60, the reflection profile 32 may be used to optimally combine the arrivals of the reflections 30 for an improved signal-to-noise ratio (illustrated as reference numeral 36 in FIG. 1). Moreover, the spatial impulse response of the nearby radio-frequency field, as sampled by the multiple antennas 60 of the communications device 20, may form a unique expression or image of the ambient environment 24. The reflection profile 32 may thus describe the distortions, the noise, and/or the interferences (illustrated as reference numerals 34-44 in FIG. 1) detected within the nearby radio-frequency field in the vicinity of the communications device 20. The reflection profile 32 thus describes the electromagnetic characteristics of the ambient environment 24, independent of the electromagnetic signature of the communications device 20 itself. The reflection profile 32, in simple terms, describes an electromagnetic reflective representation, or "photo," of the electromagnetic propagation environment at a particular place.

Exemplary embodiments, though, may be applied regardless of networking environment. As the above paragraphs mentioned, the communications network 72 may be a wireless network having cellular or WI-FI® capabilities. The communications network 72, however, may also operate using any other frequency or standard, such as the BLUETOOTH® standard or the Internet Protocol (IP). The communications network 72, however, may be a cable network operating in the radio-frequency domain and/or the Internet Protocol (IP) domain. The communications network 72, however, may also include a distributed computing network, such as the Internet or an application of the Internet (such as cloud-based computing), an intranet, a local-area network (LAN), and/or a wide-area network (WAN). The communications network 72 may include coaxial cables, copper wires, fiber optic lines, and/or hybrid-coaxial lines. The communications network 72 may even include wireless portions utilizing any portion of the electromagnetic spectrum and any signaling standard (such as the IEEE 802 family of standards, GSM/CDMA/TDMA or any cellular standard, and/or the ISM band). The communications network 72 may even include powerline portions, in which signals are communicated via electrical wiring. The concepts described herein may be applied to any wireless/wireline communications network, regardless of physical componentry, physical configuration, or communications standard(s).

Figure 3:
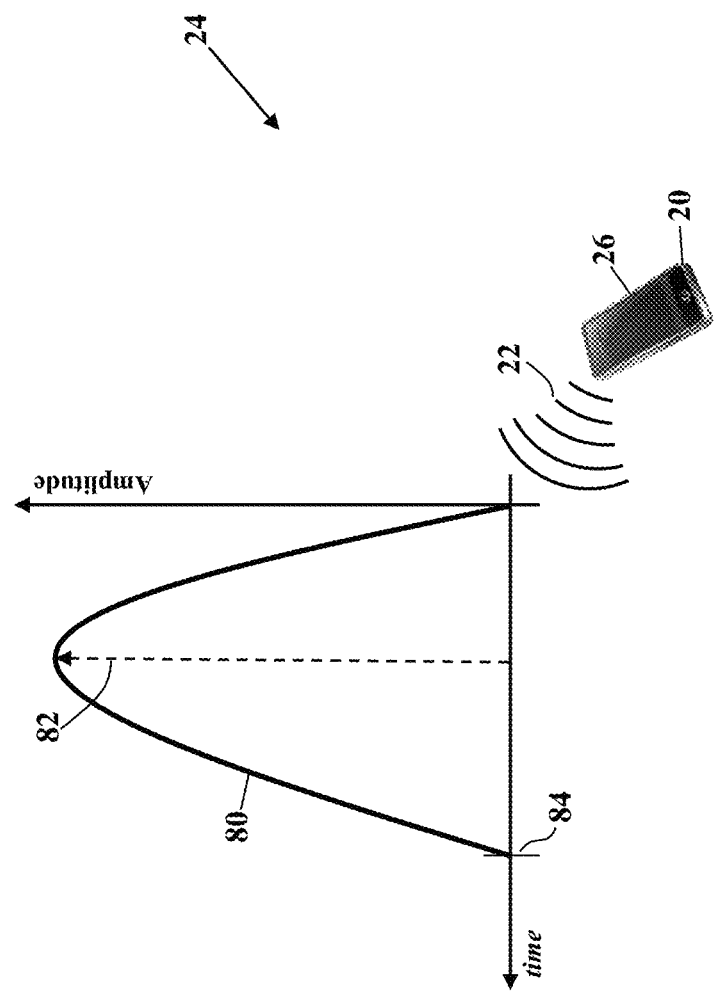
FIGS. 3-5 are schematics illustrating an electromagnetic reflective evaluation of an ambient environment, according to exemplary embodiments.
Figure 4:
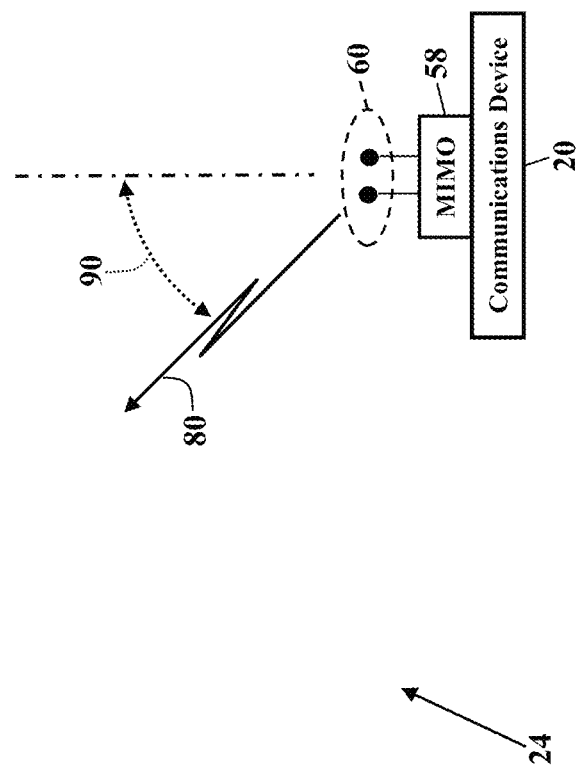
Figure 5:
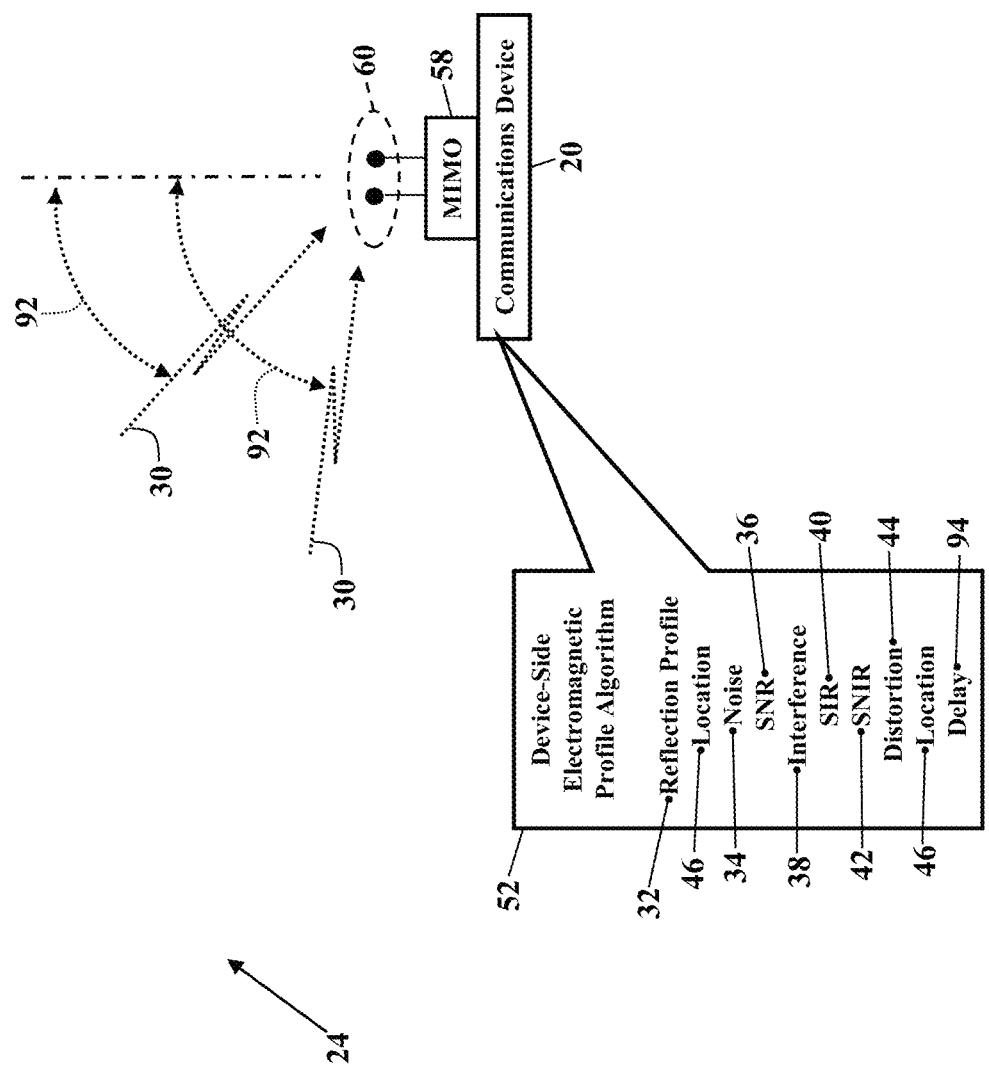

FIGS. 3-5 are schematics further illustrating an electromagnetic reflective evaluation of the ambient environment 24, according to exemplary embodiments. FIG. 3, for simplicity, illustrates the wireless communications device 20 transmitting the wireless signal 22 as a two-dimensional cellular impulse 80 of relatively large amplitude 82 and relatively low duration 84. The cellular impulse 80 thus resembles a "ping" or burst transmission to evaluate the electromagnetic reflective characteristics of the ambient environment 24. The cellular impulse 80 may contain or include any information, such as a PN-sequence or multi-tone waveform, which can be used to obtain additional direction and delay information if multiple antennas are used (e.g., MIMO configurations). While the cellular impulse 80 may have any frequency, amplitude, or duration, the large amplitude 82 of the cellular impulse 80 may be preferred for easier discernment. As those of ordinary skill in the art also understand, the cellular impulse 80 may propagate in three dimensions. As FIG. 3 illustrates the smart phone 26, the cellular impulse 80 may be sent to evaluate the electromagnetic reflective characteristics within any of the radio frequencies allocated for cellular telephony use. The United States, for example, currently allocates about 700 MHz to about 2700 MHz for cellular telephony. Other countries, though, may utilize other frequencies, and exemplary embodiments may be applied to any frequency.

FIG. 4 illustrates directional transmissions. The cellular impulse 80 may be transmitted in one or more directions. Because the communications device 20 may have the multiple antennas 60 of the multiple input, multiple output ("MIMO") system 58, the cellular impulse 80 may be aimed toward one or more transmission directions 90. The communications device 20 may thus evaluate the electromagnetic reflective characteristics in any one or more specific transmission directions 90 within the ambient environment 24.

FIG. 5 illustrates the reflections 30. The reflections 30 bounce or reflect back toward the communications device 20. Because there may be many reflective surfaces within the ambient environment 24, many reflections 30 may return propagate to the communications device 20. The reflections 30 are received by the multiple antennas 60 of the multiple input, multiple output system 58. The reflections 30 are thus responses to the cellular impulse (illustrated as reference numeral 80 in FIGS. 3-4) that are received by the communications device 20. Because the reflections 30 are received by the multiple antennas 60, the processor 50 may infer a reflection direction 92 associated with each reflection 30. That is, the communications device 20 may determine spatial vectors associated with each reflection 30.

The reflection profile 32 may then be generated. The device-side electromagnetic profile algorithm 52 knows the transmission characteristics (e.g., the amplitude 82 and duration 84 illustrated in FIG. 3) of the cellular impulse 80 sent from the communications device 20. The device-side electromagnetic profile algorithm 52 knows the transmission direction 90 of the cellular impulse 80 sent from the communications device 20 (as illustrated in FIG. 4). The device-side electromagnetic profile algorithm 52 may then compare each reflection 30, and each reflection direction 92, to ascertain the electromagnetic reflective characteristics of the ambient environment 24. Exemplary embodiments may thus determine the electromagnetic reflective characteristics in any direction from the communications device 20.

The reflection profile 32 may be enhanced. As the transmission and reflection characteristics are now known, the device-side electromagnetic profile algorithm 52 may thus also determine the noise 34, the distortion 44, and the interference 38 caused by, or associated with, the ambient environment 24. The signal-to-noise ratio ("SNR") 36 may be determined, along with the signal-to-interference ratio ("SIR") 40 and the signal-to-noise plus interference ratio ("SNIR") 42. The distortion 44 caused by the ambient environment 24 may also be determined. The reflection profile 32 may be associated to the location 46 for future reference.

Delay 94 may also be determined. Exemplary embodiments may compare a time of transmission and subsequent times of receipt for the various reflections 30. Any timing differences may thus describe the delay 94 caused by the ambient environment 24. The delay 94 may thus help distinguish unwanted reflective signals from legitimate or desired signals received from the wireless access point 70.

Exemplary embodiments include other transmission and reception options. FIGS. 3-5 illustrate the wireless communications device 20 transmitting the wireless signal 22 and receiving the reflections 30. This nearly simultaneous transmission and receipt may allow the wireless communications device 20 to detect the reflection profile 332 using local information. Exemplary embodiments, though, also include transmission and reception to/from other componentry in the communications network 72. For example, later paragraphs will explain how the wireless signal 22 may be transmitted from a base station or the wireless access point (illustrated as reference numeral 70 in FIG. 2). Indeed, later paragraphs will explain that the reflections 30 may also be received by the wireless access point 70.

Figure 6:
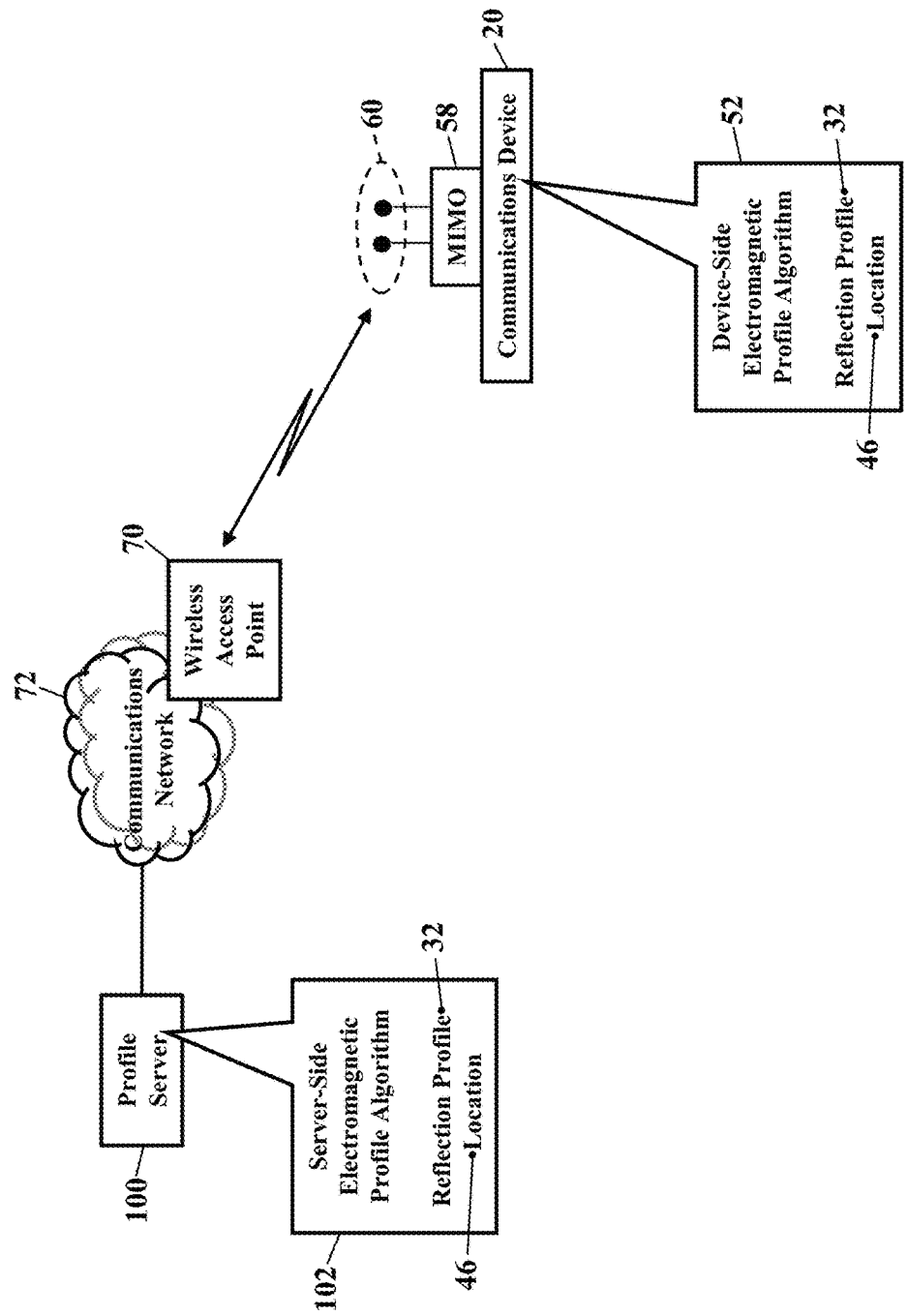
FIG. 6 is a schematic illustrating remote determination of a reflection profile, according to exemplary embodiments.

FIG. 6 is a schematic illustrating remote determination of the reflection profile 32, according to exemplary embodiments. Here a remotely-located profile server 100 may help at least partially determine the reflection profile 32. The profile server 100 communicates with the communications device 20 via the communications network 72. As many readers may know, electromagnetic theory may require intensive mathematical calculations and/or signal comparisons. Any comparison between the transmitted cellular impulse and the reflections (illustrated as reference numerals 80 and 30 in FIGS. 4-5), for example, may require vector calculations and/or at least a partial solution of Maxwell's equations. These determinations are often computationally complex, which may tax the processing abilities of the communications device 20. Exemplary embodiments, then, may offload some or all of these burdensome calculations to the profile server 100. The profile server 100 may have a processor and memory that execute a server-side electromagnetic profile algorithm 102. The communications device 20 and the profile server 100 may thus cooperate to determine the reflection profile 32. The computational contribution provided by the profile server 100 may be some or all of the reflection profile 32, depending on usage of the communications device 20, bandwidth, load, and any other network or device condition. The server-side device-side electromagnetic profile algorithm 52 may thus at least partially determine the reflection profile 32 and then send any portion of the reflection profile 32 to the communications device 20. The communications device 20 may thus be dedicated to less complex processing.

Figure 7:
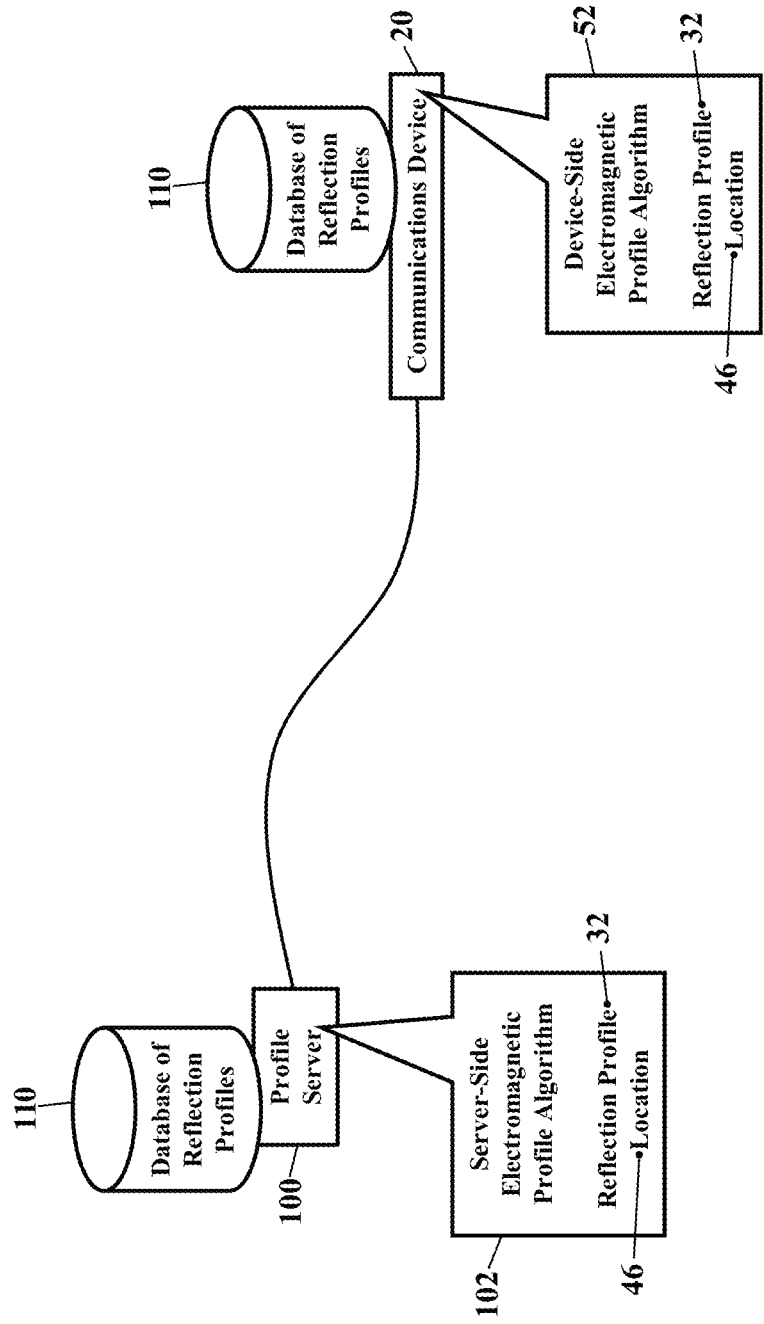
FIGS. 7-11 are schematics illustrating a database of reflection profiles, according to exemplary embodiments.
Figure 8:
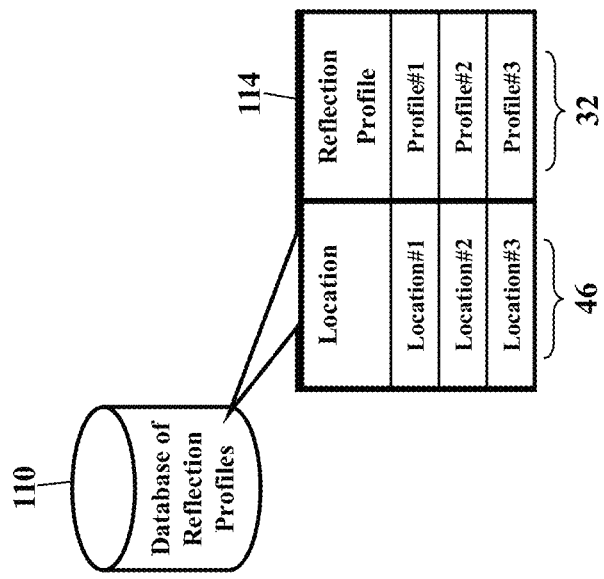

FIGS. 7-10 are schematics illustrating a database 110 of reflection profiles, according to exemplary embodiments. As this disclosure explains above, exemplary embodiments evaluate the electromagnetic reflective characteristics of any ambient environment 24. Because the reflection profile 32 may be linked to its corresponding location 46, different reflection profiles 32, for different locations 46, may be stored in the database 110 of reflection profiles. FIG. 7 illustrates how the database 110 of reflection profiles may be at least locally stored in the communications device 20 and/or the profile server 100. Regardless, FIG. 8 illustrates the database 110 of reflection profiles as a table 112 that maps, relates, or otherwise associates different locations 46 to their corresponding reflection profiles 32. While FIG. 8 only illustrates a few entries, in practice the database 110 of reflection profiles may have hundreds or thousands of entries for many different locations. Whenever the reflection profile 32 is generated, the reflection profile 32 may be stored in association with its corresponding location 46.

Figure 9:
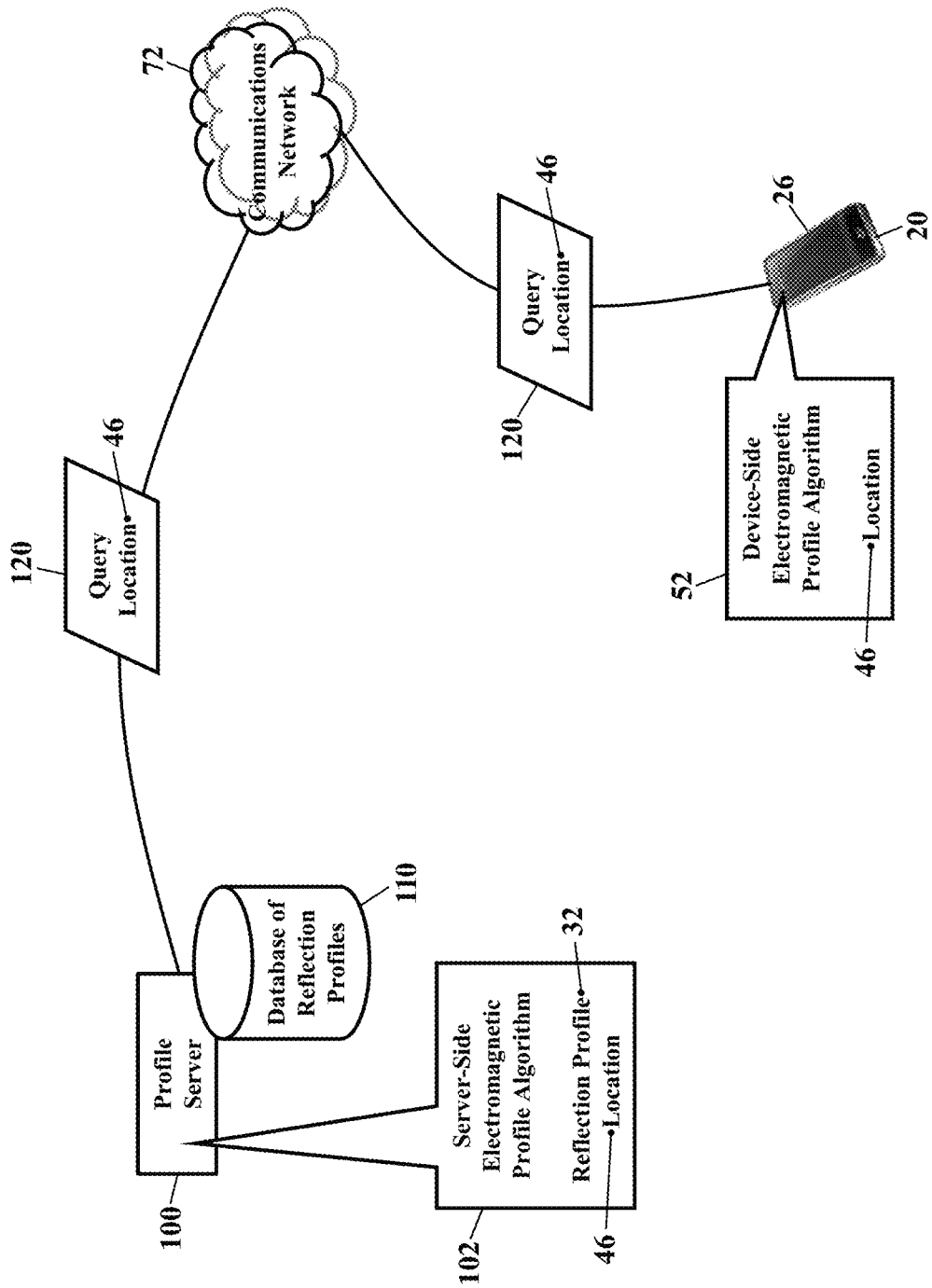
Figure 10:
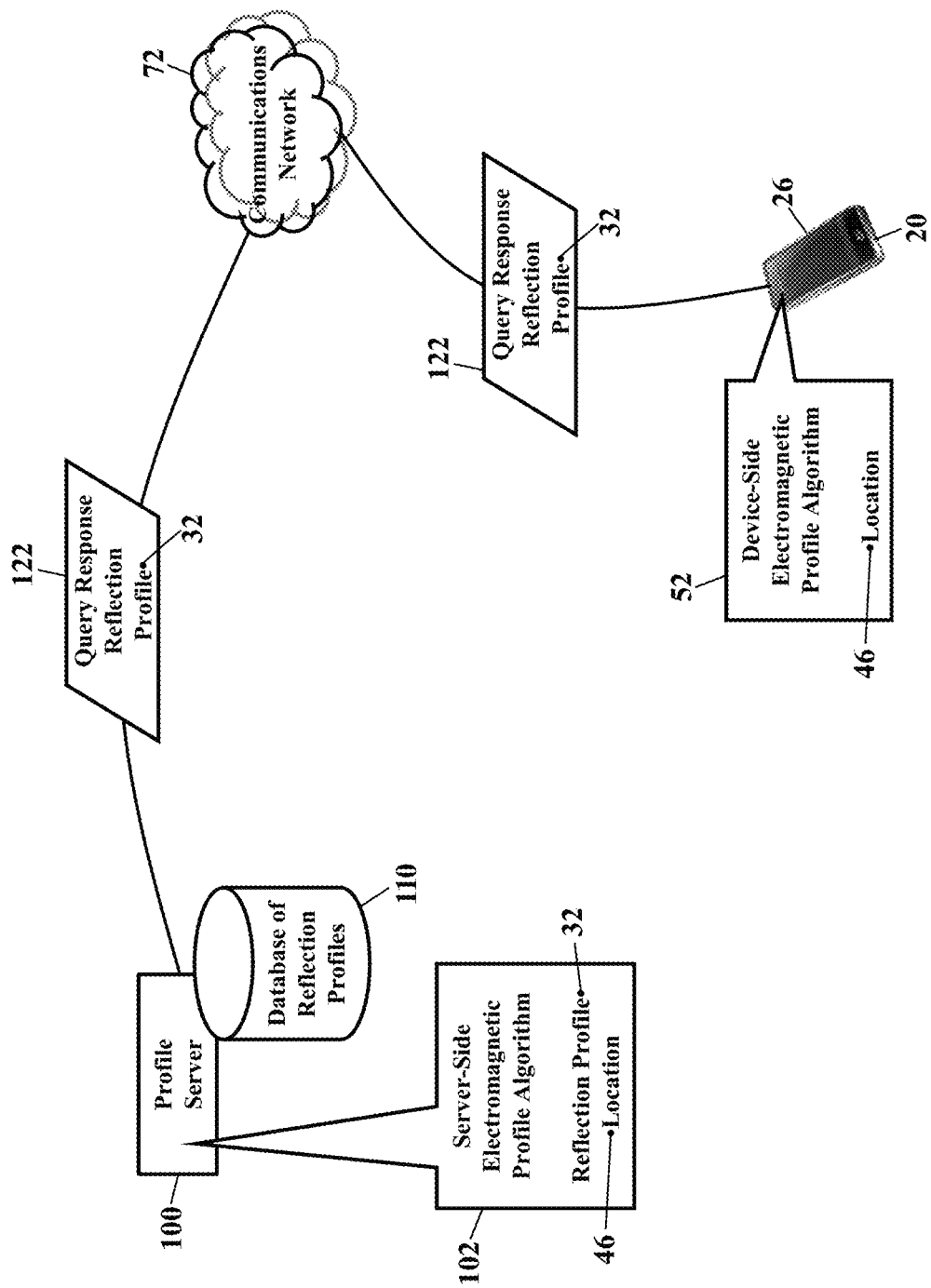

FIGS. 9-10 illustrate database queries. Wherever the communications device 20 roams, travels, or moves, the communications device 20 may want to obtain the reflection profile 32 for its current location 46, particularly if the device remains in a nearly fixed location for some time due to intensive use by its user. Indeed, exemplary embodiments may permit the user to indicate that the reflection profile 32 at the location 46 should be saved for subsequent use (as later paragraphs will explain). The device-side electromagnetic profile algorithm 52 may thus cause the processor 50 to send a query 120. The query 120 specifies the current location 46 of the communications device 20. FIG. 9 illustrates the query 120 communicating via the communications network 72 to the network address associated with the profile server 100. When the profile server 100 receives the query 120, a query handler queries the database 110 of reflection profiles for the current location 46 associated with the communications device 20. The profile server 100 retrieves the corresponding reflection profile 32 associated with the current location 46. As FIG. 10 illustrates, the profile server 100 then sends the corresponding reflection profile 32 as a query response 122. The query response 122 communicates along the communications network 72 to the network address associated with the communications device 20.

The reflection profile 32 may thus be applied. Because the reflection profile 32, for the current location 46, is now known, the reflection profile 32 may be applied to transmissions and receptions within the same location 46. The reflection profile 32, for example, may be applied to adjust amplifier and antenna gains. Quality and characteristics of transmissions may be adjusted according to the reflection profile 32. The reflection profile 32 may also be used to improve recognition and reception of signals.

The database 110 of reflection profiles may also help conserve electrical power. As this disclosure explains above, the reflection profile 32 may require difficult and complex calculations. Indeed, the processor (illustrated as reference numeral 50 in FIG. 2) in the communications device 20 may bog down during these computations, thus at least temporarily stalling applications. Moreover, electrical energy (such as current and voltage) from a battery is heavily consumed during these intensive calculations. Exemplary embodiments, though, may allow the communications device 20 to avoid these taxing computations. Sometimes the communications device 20 and/or the profile server 100 need only query the database 110 of reflection profiles for the current location 46. The corresponding reflection profile 46 may be quickly retrieved and reused with little or no burdensome calculations. Time and battery power are thus conserved by retrieving a previously-determined reflection profile 32 that has been historically observed at the same or similar location 46. Other times, though, conditions may warrant updating or recalculating a new reflection profile 32. For example, sometimes the multiple input, multiple output ("MIMO") system (illustrated as reference numeral 58 in FIGS. 1-6) must constantly update its directional and time domain measurements to optimize the transmission/reception of signals with a base station. MIMO systems must allow this processing to be active at all times when receiving signals.

Figure 11:
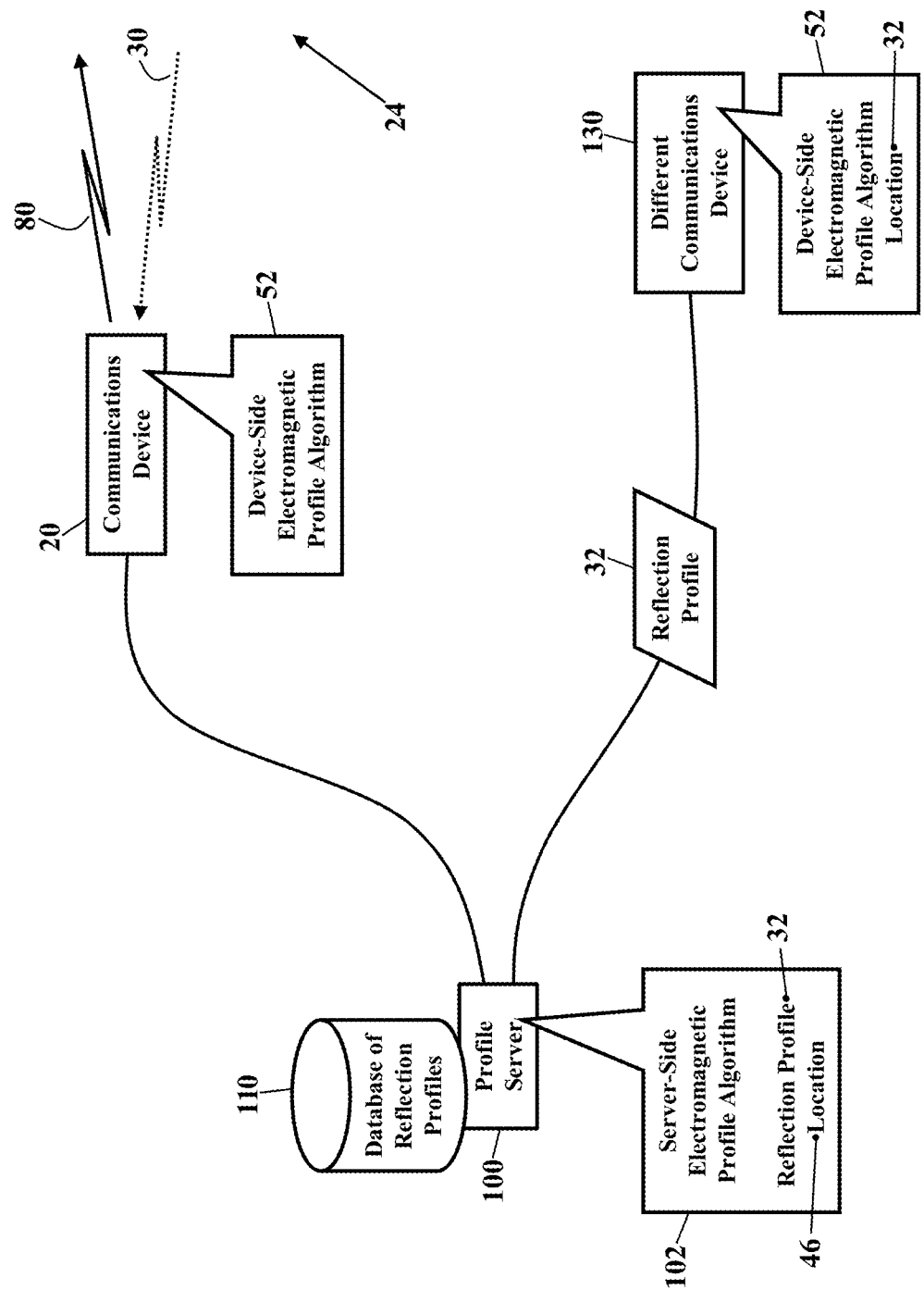

FIG. 11 is another schematic illustrating the database 110 of reflection profiles, according to exemplary embodiments. Here the database 110 of reflection profiles may be accessed by any device operating in the same location 46. That is, wherever any device operates, the device need not calculate its own reflection profile 32 for the location 46. The device, instead, may merely query for the reflection profile 32 associated with the location 46, even if determined from a different device. The reflection profile 32, in other words, may be device-agnostic.

FIG. 11 illustrates this agnosticism. The wireless communications device 20 sends the cellular impulse 80 and receives the reflections 30. The reflection profile 32 is either locally determined by the communications device 20, or the reflection profile 32 may be at least partially determined by the profile server 100. Regardless, the reflection profile 32 is now associated with the current location 46 of the user's communications device 20.

Now, suppose a different user enters the location 46. The different user has a different communications device 130. The different communications device 130 registers, roams, or operates within the vicinity or region of the location 46. The different communications device 130, for example, may be another user's wireless phone, laptop, tablet, or any other networked device. If the different communications device 130 needs the electromagnetic reflective characteristics of the same ambient environment 24, the different communications device 130 could undertake its own determination. That is, the different communications device 130 could send its own cellular impulse 80, receive the corresponding reflections 30, and repeat the calculations for the reflection profile 32.

Exemplary embodiments, though, may merely query the database 110 of reflection profiles. Instead of recalculating the reflection profile 32, for the same location 46, the different communications device 130 may simply query database 110 of reflection profiles. The different communications device 130 determines its location 46 and queries the database 110 of reflection profiles (as FIGS. 9-10 illustrate). The different communications device 130 thus receives the reflection profile 32 associated with the location 46. Even though the reflection profile 32 was previously determined from the communications device 20, the reflection profile 32 may still be applied to transmissions and receptions of the different communications device 130. This similarity may certainly be true when different communications devices are the same model and/or the same manufacturer. Indeed, the configuration and/or performance of the multiple input, multiple output system (illustrated as reference numeral 58 in FIG. 2) may be so similar that the reflection profile 32 may be applicable to any device operating in the location 46. The reflection profile 32, in other words, may be device-agnostic. The different communications device 130 may thus quickly apply the reflection profile 32 to its transmissions and receptions, even though determined from a different device (e.g., the communications device 20). The different communications device 130 is thus relieved from unnecessarily repeating the determination of the reflection profile 32.

Figure 12:
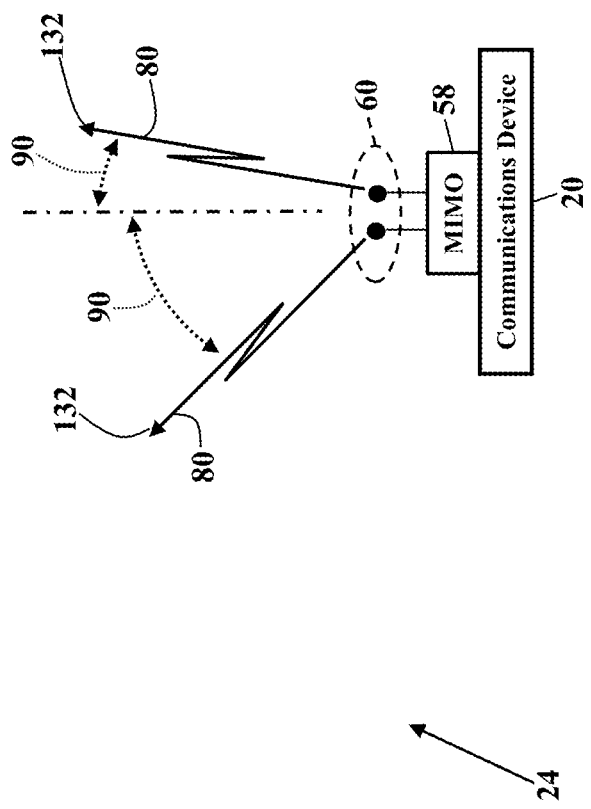
FIGS. 12-13 are schematics illustrating a multiple input, multiple output ("MIMO") system, according to exemplary embodiments.
Figure 13:
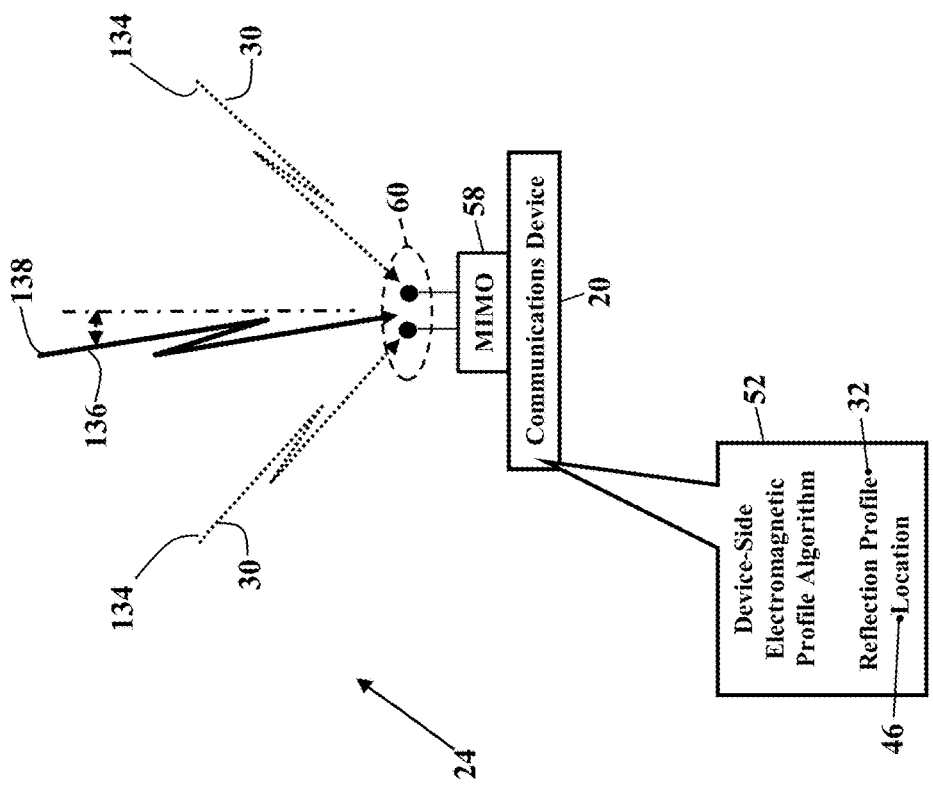

FIGS. 12-13 are schematics further illustrating the multiple input, multiple output ("MIMO") system 58, according to exemplary embodiments. FIG. 12 illustrates how the cellular impulse 80 may be transmitted from multiple ones of the antennas 60 in the multiple input, multiple output system 58. FIG. 12, for example, illustrates two (2) antennas 60, so the cellular impulse 80 may be transmitted from one antenna or from both antennas. The device-side electromagnetic profile algorithm 52 may even cause the multiple input, multiple output system 58 to transmit the cellular impulse 80 in the same or different transmission directions 90. Each cellular impulse 80 may be mathematically represented as a transmission vector 132 in one or multiple dimensions.

FIG. 13 illustrates the reflections 30. The reflections 30 propagate back to the multiple input, multiple output ("MIMO") system 58. One or more of the antennas 60 thus receive each reflection 30. Each reflection 30 may be represented by its corresponding field vector 134. When multiple reflections 30 are received, the multiple reflections 30 may be represented as a composite signal 136 having a composite vector 138. The vector representations of the transmitted cellular impulse 80 and the reflections 30 may then be used to determine the reflection profile 32.

Figure 14:
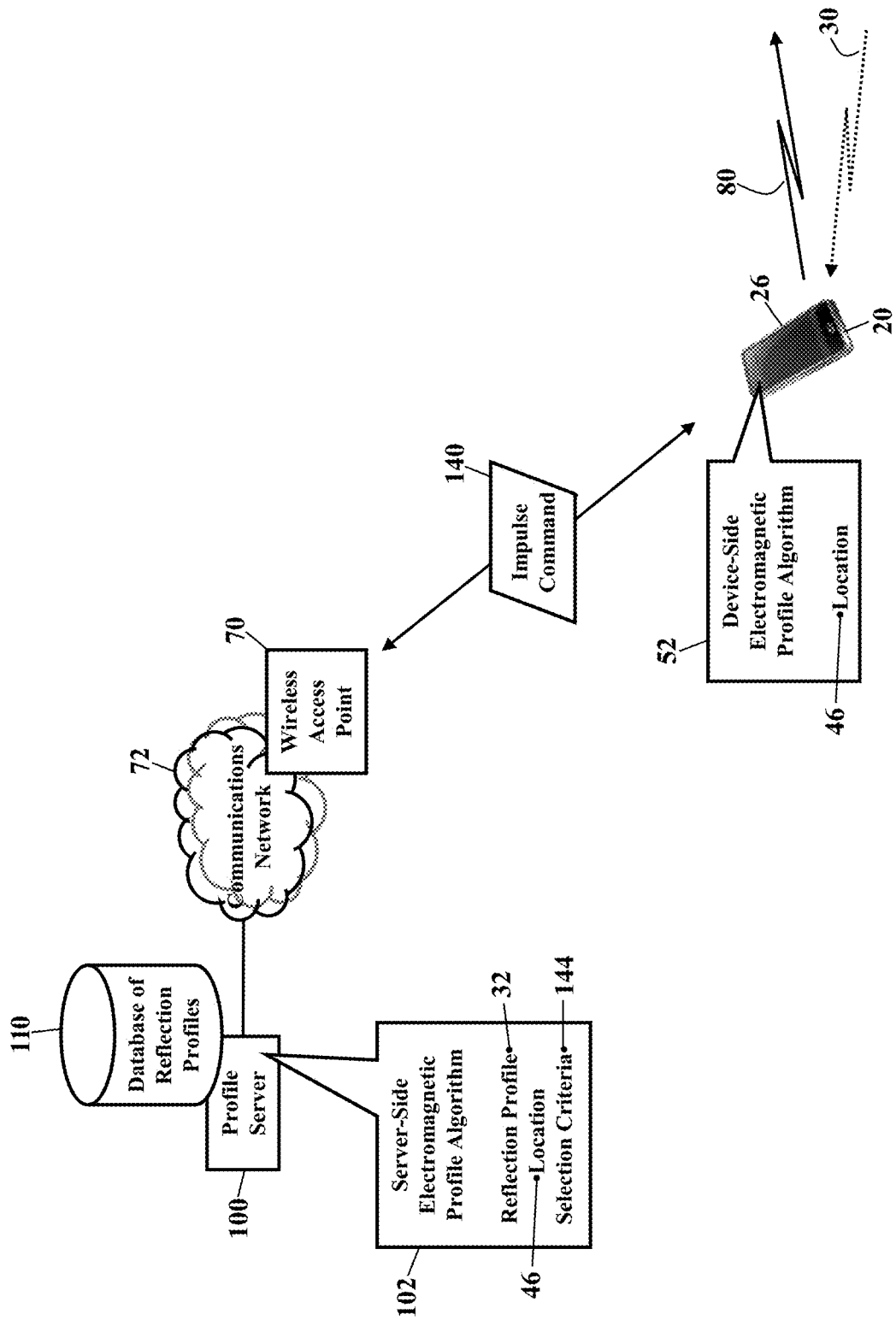
FIGS. 14-15 are schematics illustrating remote evaluation commands, according to exemplary embodiments.
Figure 15:
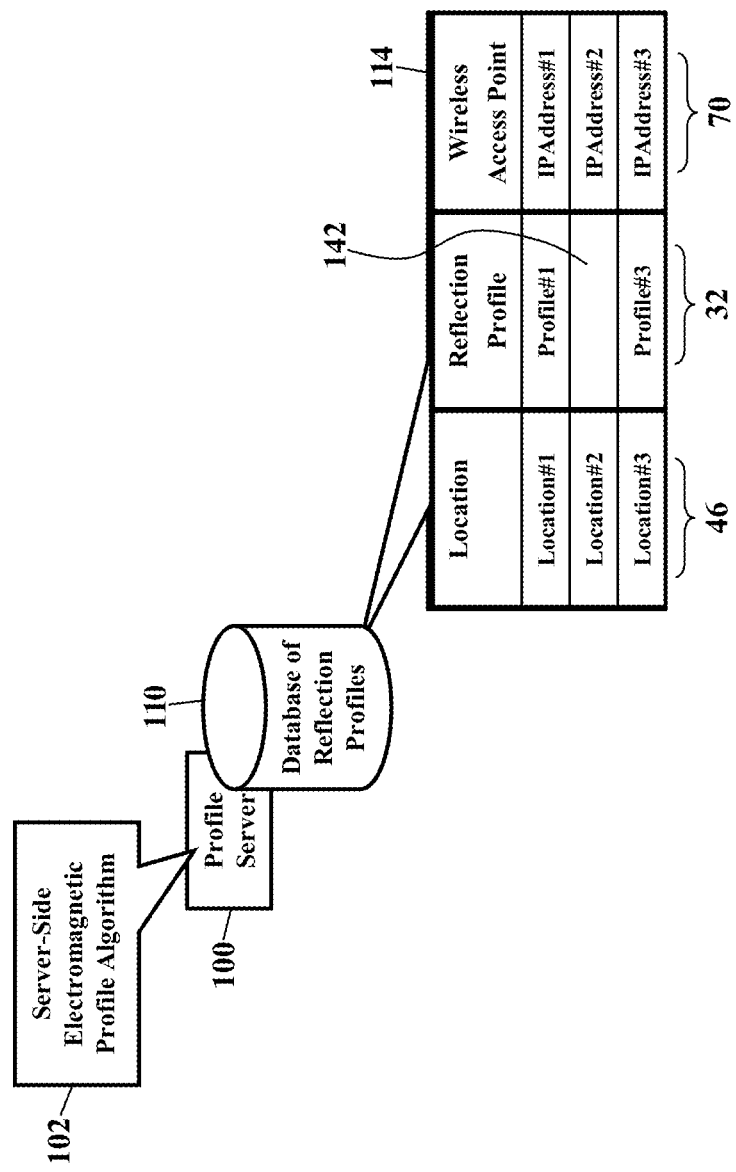

FIGS. 14-15 are schematics illustrating remote evaluation commands, according to exemplary embodiments. Here the communications device 20 may be remotely commanded to transmit the cellular impulse 80. Sometimes the intelligence in the communications network 72 may want to learn the electromagnetic reflective characteristics of some location 46. FIG. 14, for example, illustrates an impulse command 140 that is sent to the communications device 20. The impulse command 140 may originate from the profile server 100. Sometimes the database 110 of reflection profiles may have an empty or null entry for a particular location 46. That is, the reflection profile 32 is unknown for some location 46. The profile server 100 may thus need to determine the reflection profile 32 for the particular location 46.

The profile server 100 may thus fill empty entries in the database 110 of reflection profiles. Whenever the database 110 of reflection profiles is incomplete, the profile server 100 may command any device in the particular location of need to undertake an evaluation of the reflection profile 32. The profile server 100, for example, may instruct the wireless access point 70 to poll for the various devices operating within its range. Any polling response may thus identify a candidate device that can undertake the reflection profile 32.

FIG. 15 thus illustrates the database 110 of reflection profiles. Here the database 110 of reflection profiles may include entries for the wireless access point 70 associated with the location 46. When the database 110 of reflection profiles contains an empty entry 142 for the location 46, the profile server 100 may query the database 110 of reflection profiles for the wireless access point 70 associated with the location 46.

Returning to FIG. 14, the profile server 100 may then determine what devices are communicating with the wireless access point 70. The profile server 100, for example, may instruct the wireless access point 70 to send a polling message to any devices within its range. Any polling response may then be a candidate to undertake the reflection profile 32. The profile server 100 may thus route the impulse command 140 to a candidate device communicating with the wireless access point 70. The impulse command 140 instructs the candidate device to transmit the cellular impulse 80 and to receive the corresponding reflections 30. The candidate device and the profile server 100 may then cooperate to determine the reflection profile 32 for the location 46, as this disclosure explains. The profile server 100 may then populate the database 110 of reflection profiles with the reflection profile 32.

The profile server 100 may select the candidate device. There may be many devices communicating with the wireless access point 70. Some of those devices may be better suited to determining the reflection profile 32. Some devices, for example, may have better processing capabilities, such as faster processor or more memory. Some devices may have better signal strength. Some devices may be more representative of a popular manufacturer or model. Exemplary embodiments, then, may include selection criteria 144 for determining the candidate device. The device that best satisfies the selection criteria 144 may be instructed to transmit the cellular impulse 80.

Figure 16:
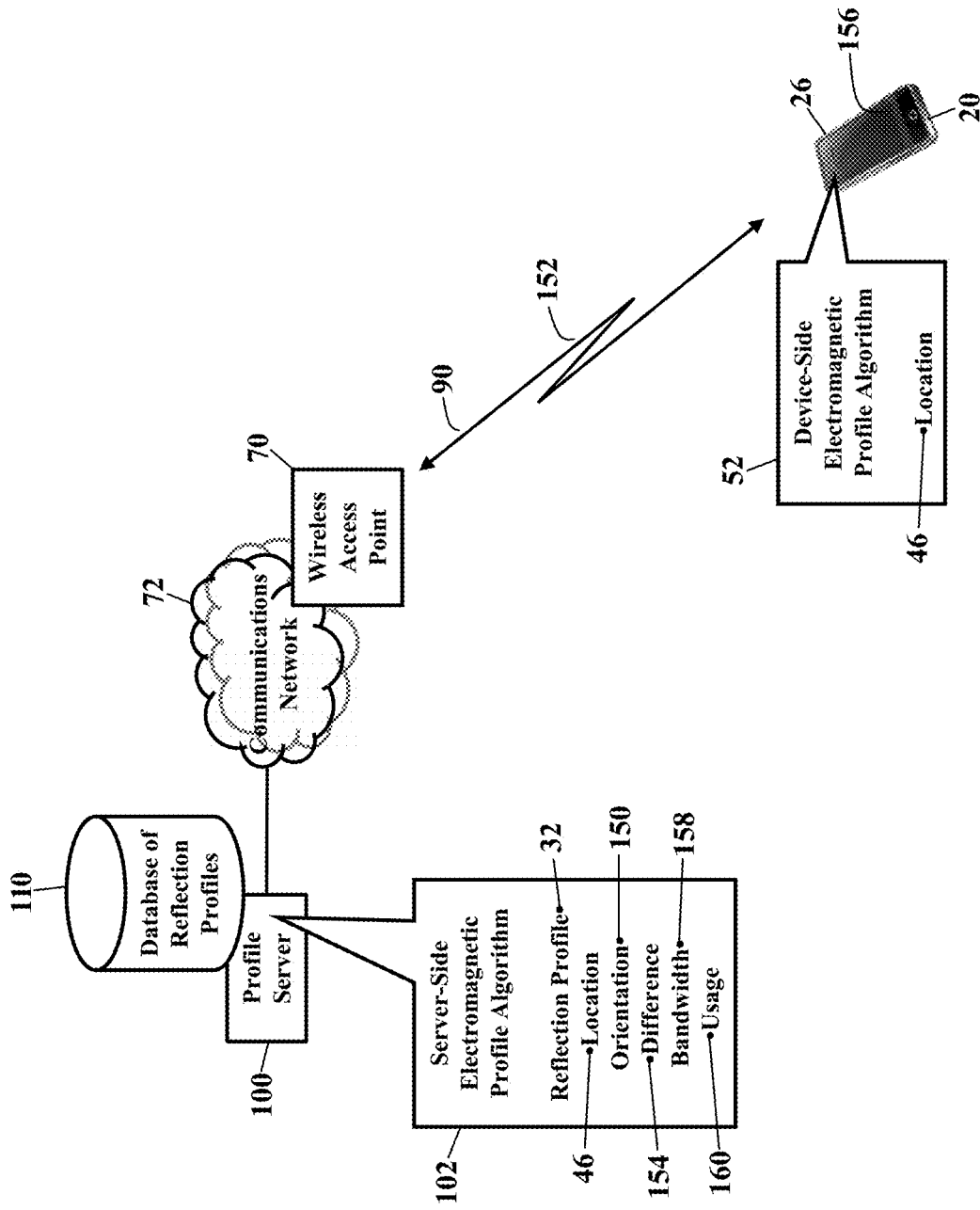
FIG. 16 is a schematic illustrating an orientation determination, according to exemplary embodiments.

FIG. 16 is a schematic illustrating an orientation determination, according to exemplary embodiments. As the above paragraphs explained, the reflection profile 32 describes the electromagnetic reflective characteristics of any indoor and/or outdoor environment. Once the reflection profile 32 is known, the reflection profile 32 may then be used to improve services. FIG. 16, for example, illustrates how the reflection profile 32 may be used to determine an orientation 150 of the wireless communications device 20. As many readers know, mobile communications devices (such as the smart phone 26) may have many different orientations of use. Some users, for example, may find a portrait orientation preferable, while others may prefer a landscape orientation. Indeed, websites, video movies, and other content may be optimized for a particular orientation. Exemplary embodiments, then, may use the reflection profile 32 to infer the orientation 150 of the communications device 20.

When the wireless access point 72 communicates with the communications device 20, the orientation 150 may be determined. As FIG. 16 illustrates, the communications device 20 sends any electromagnetic signal 152 to the wireless access point 72. When the wireless access point 72 receives the signal 152, the signal 152 may be compared to the reflection profile 32. Any difference 154 between the signal 152 and the reflection profile 32 may be related to the orientation 150 of the communications device 20. That is, any electromagnetic difference 154 between the signal 152 and the reflection profile 32 may indicate the orientation 150 of the communications device 20. The signal 152, for example, may have a difference 154 in phase, thus indicating the communications device 20 is upside down from the data in the reflection profile 32. The transmission direction 90 of the signal 152 may yield the difference 154, thus also indicating the orientation 150 of the communications device 20. Any difference 154 between the signal 152 and the reflection profile 32 may be related to the orientation 150 of the communications device 20.

The orientation 150 has many uses. Once the orientation 150 of the communications device 20 is determined, a display screen 156 may be switched from a portrait to landscape and vice versa. The orientation 150 of the communications device 20 may also indicate a direction of movement. Many people, for example, orient their communications device 20 parallel or transverse (perpendicular) to their current direction of movement. Moreover, if the orientation 150 is "face down," the communications device 20 may not be in current use. That is, if the orientation 150 indicates the communications device 20 is upside down (e.g., the display screen 156 is facing down to the Earth), the communications device 20 is likely not currently be used.

The orientation 150 may also indicate bandwidth 158. The bandwidth 158 allocated to the communications device 20 may vary based on the orientation 150. Again, if the communications device 20 is oriented upside down, exemplary embodiments may cease or reduce allocation of the bandwidth 158 to the communications device 20. The orientation 150 of the communications device 20 may thus be used to throttle the bandwidth 158 to the communications device 20.

The orientation 150 may also indicate usage 160. The orientation 150 may be used to predict how the communications device 20 is about to be used. Some orientations 150, for example, are commonly used during telephony operations, such as when the communications device 20 is oriented to the user's ear. When the orientation 150 correlates or matches historical orientations associated with telephony usage 160, exemplary embodiments may thus predict or anticipate the corresponding telephony usage 160. The communications network 72 may thus automatically begin configuring the telephony usage 160, based on the orientation 150. The database 110 of reflection profiles may thus also store entries that associate the orientation 150 to the usage 160. Once the orientation 150 is determined, the same historical usage 160 may be predicted.

Indeed, the orientation 150 and the usage 160 may be habitual. Once the profile server 100 obtains the current location 46 of the communications device 20, the profile server 100 may query the database 110 of reflection profiles for the location 46. Here, though, the database 110 of reflection profiles may respond with the orientation 150 and the usage 160 that are commonly or habitually observed at that same location 46. The reflection profile 32, in other words, may track historical orientations 150 and usages 160 for each location 46. As many users are creatures of habit, exemplary embodiments may expect habitual orientations 150 and usages 160 at the same location 46. So, once the current location 46 is known, the profile server 100 predict how the communications device 20 will be oriented and used. The profile server 100 may then instruct the communications network 72 to anticipate the same orientation 150 and the usage 160 and proactively configure. Likewise, the profile server 100 may instruct the communications device 20 to proactively configure for the anticipated orientation 150 and the usage 160.

The orientation 150 may be expressed in one or more dimensions. As electromagnetic signals may be expressed or represented as vectors, mathematical vector operations may be used to determine the orientation 150 of the communications device 20. For example, the orientation 150 may be expressed as yaw, pitch, and roll values. These expressions of the orientation 150 may also indicate a context in how the communications device 20 is being used, such as the bandwidth 158 and the usage 160 explained above.

Figure 17:
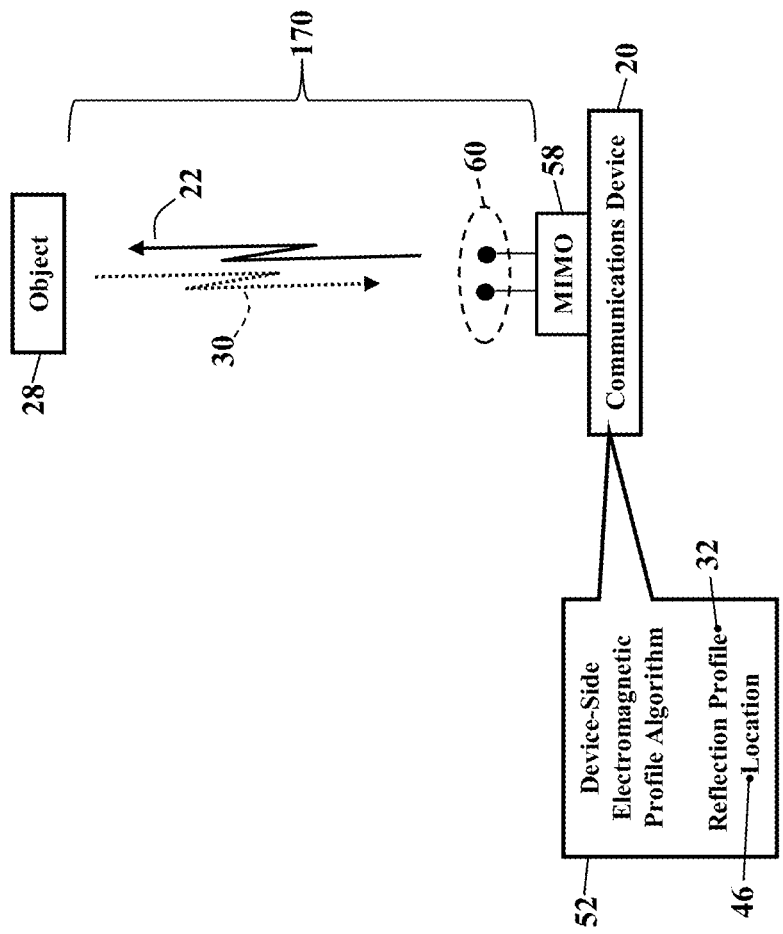
FIG. 17 is a schematic illustrating distance calculations, according to exemplary embodiments.

FIG. 17 is a schematic illustrating distance calculations, according to exemplary embodiments. Here the cellular impulse 80 may be used to determine a distance 170 to any physical object 28. When the cellular impulse 80 is transmitted from the communications device 20, the cellular impulse 80 reflects from the physical object 28. The reflection(s) 30 thus propagate back to the communications device 20. Electromagnetic signals in air travel at the constant speed of light c, so the round-trip time may thus be used to calculate the distance 170 to the physical object 28.

The distance 170 may then be used to improve the user experience. If the communications device 20 has a camera, for example, the distance 170 may be used to focus the camera. Distance calculations may also be important in gaming and in virtual reality, where accurate distance measurements may improve user interfaces, 3-D renderings, and virtual experiences. Virtual graffiti, for example, may be sized, oriented, and displayed at the proper distance 170 in the viewing area. The ability to calculate the distance 170 to the physical object 28, of course, may also be very useful for architects, engineers, and construction workers. Runners and coaches may appreciate the ability to accurately measure distances. Indeed, the ability to merely point the communications device 20 toward the physical object 28, and to easily calculate the distance 170, is desired by many people in many situations.

Figure 18:
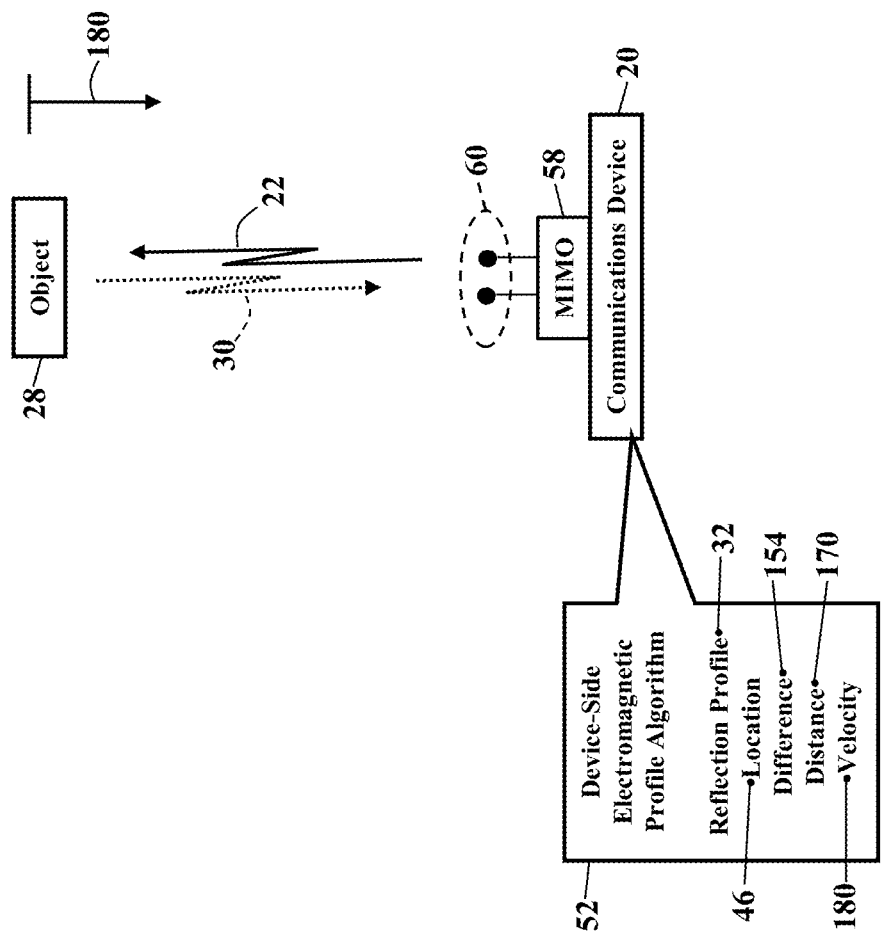
FIGS. 18-19 are schematics illustrating velocity calculations, according to exemplary embodiments.
Figure 19:
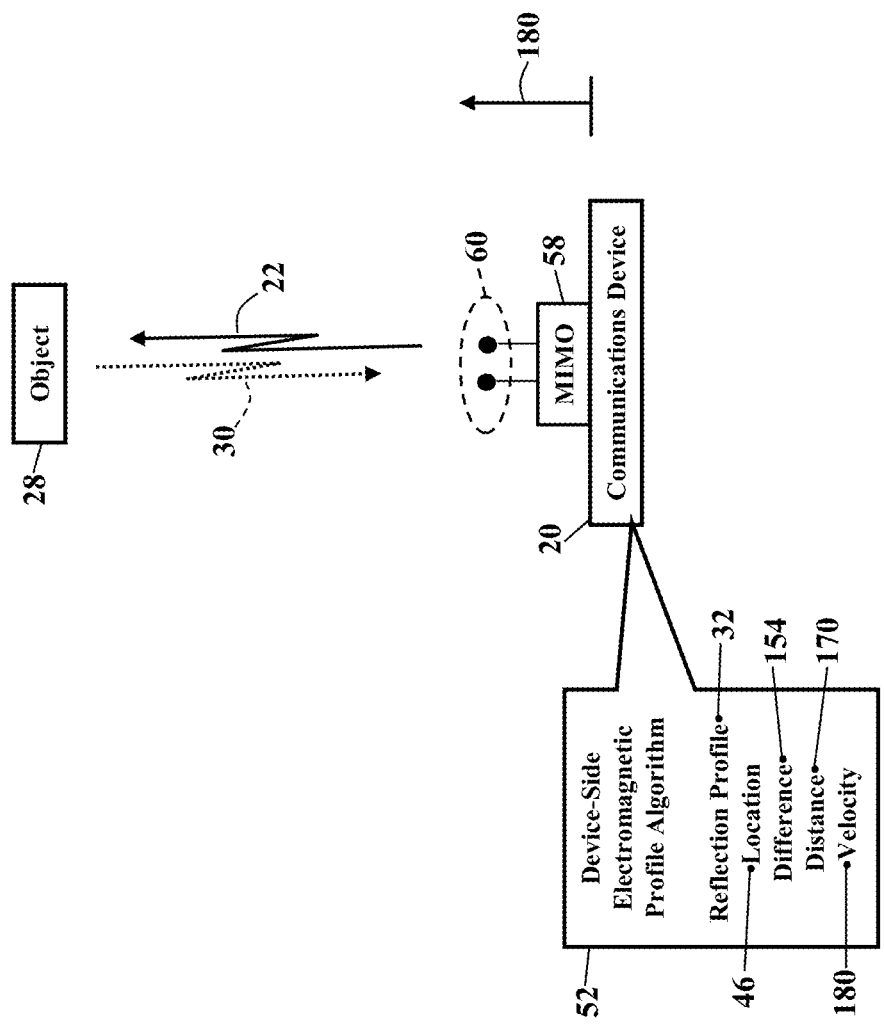

FIGS. 18-19 are schematics illustrating velocity calculations, according to exemplary embodiments. Here the cellular impulse 80 may be used to determine a velocity 180 of movement. When the cellular impulse 80 is transmitted from the communications device 20, the reflection(s) 30 propagate back to the communications device 20. The reflections 30, however, may have the difference 154 in frequency. The difference 154 in frequency may indicate the physical object 28 is moving. A frequency shift between the cellular impulse 80 and the reflections 30 is proportional to the velocity 180 of movement of the physical object 28, according to the Doppler effect. FIG. 19 is similar, but here the cellular impulse 80 may be used to determine the velocity 180 of movement of the communications device 20 itself. Exemplary embodiments, then, allow the user to merely point the communications device 20 toward the physical object 28 and easily determine the velocity 180 of movement.

Figure 20:
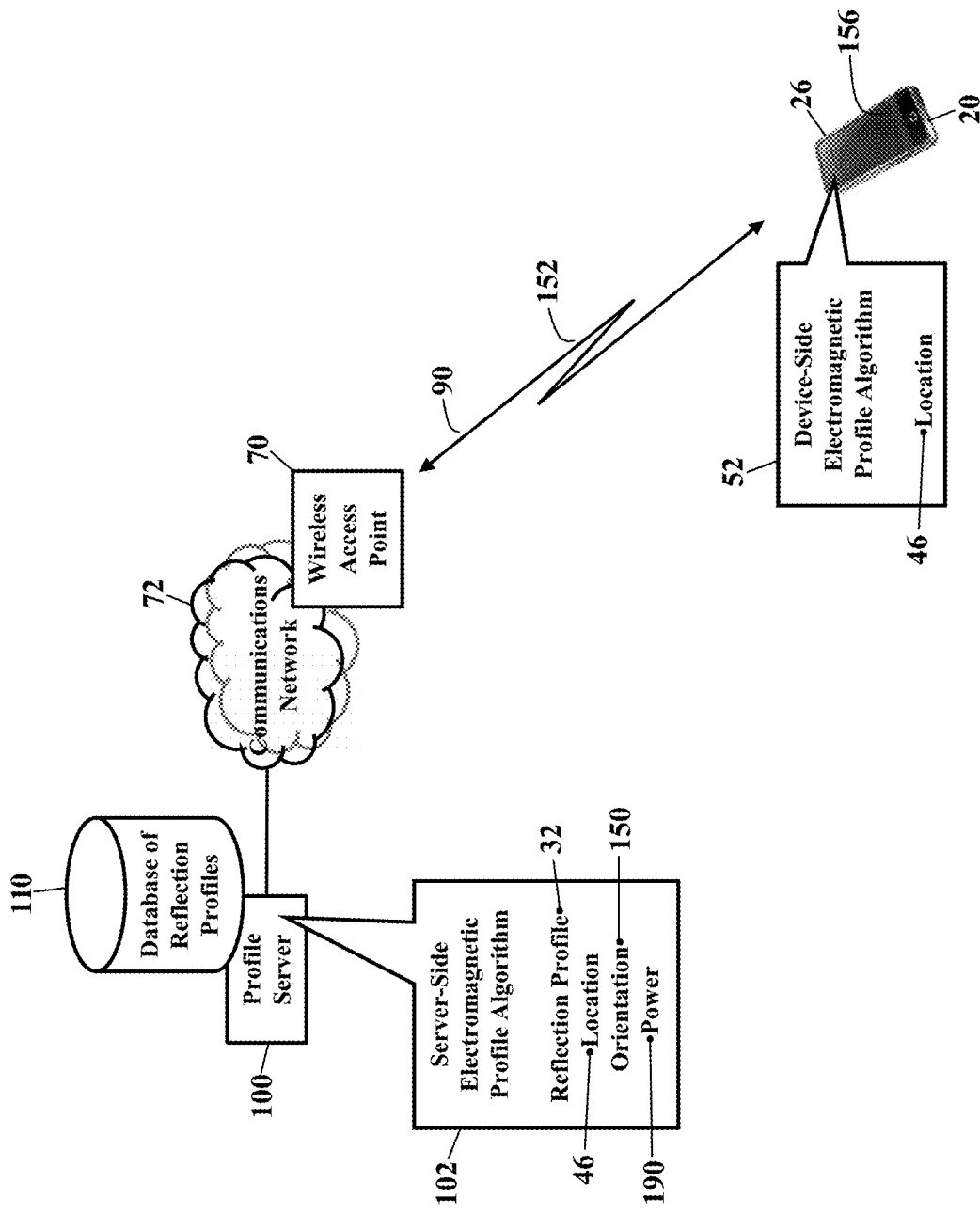
FIGS. 20-21 are schematics further illustrating the orientation determination, according to exemplary embodiments.
Figure 21:
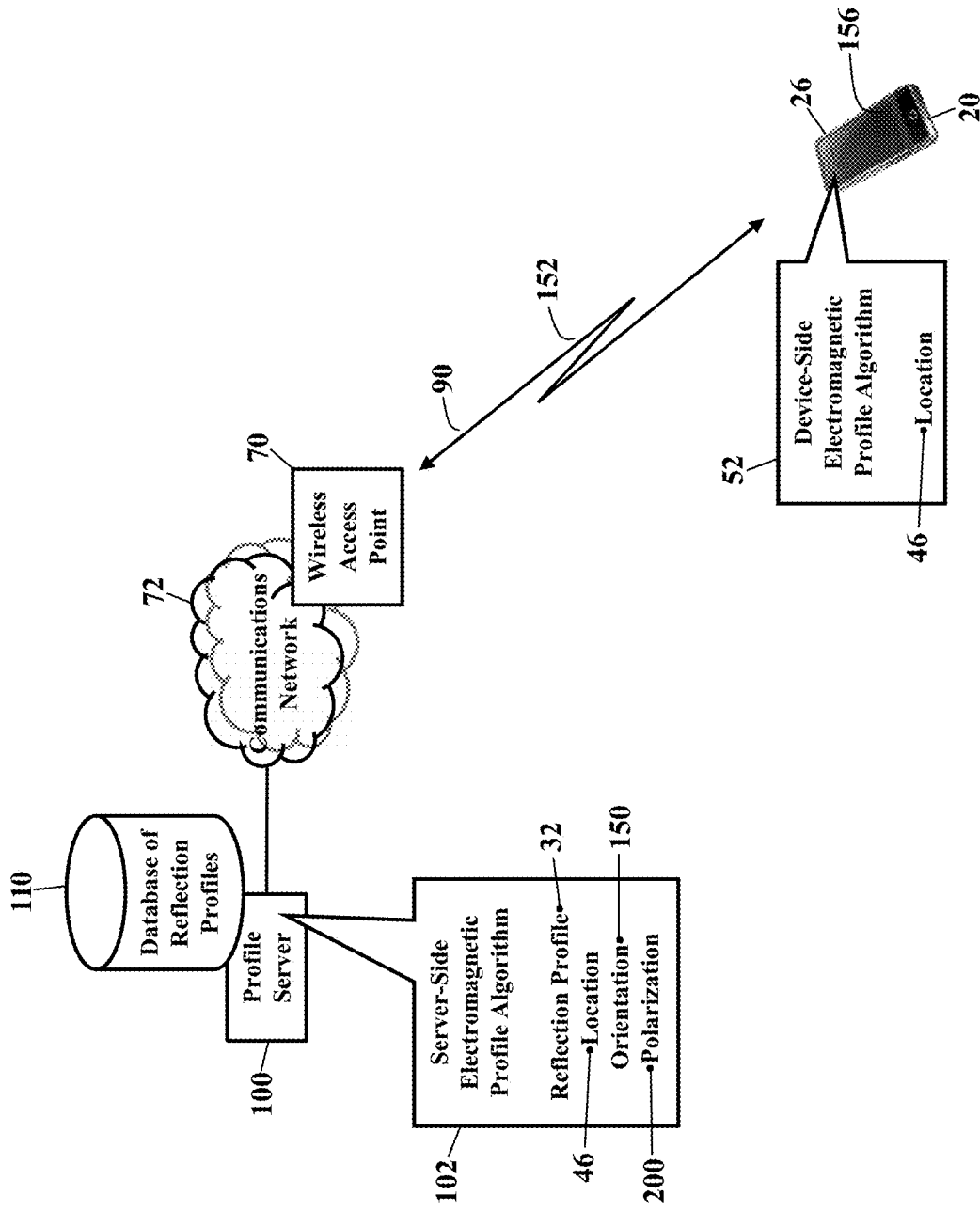

FIGS. 20-21 are schematics further illustrating the orientation 150 of the communications device 20, according to exemplary embodiments. Here again the reflections 30 may be used to determine the orientation 150 of the wireless communications device 20. When the reflections 30 are received at the communications device 20, the reflection profile 32 may determine an electromagnetic power 190 transported by any one or more of the reflections 30. The electromagnetic power 190, for example, may be determined from Poynting's theorem. The electromagnetic power 190 may then be associated to different orientations 150 of the communications device 20. Moreover, the electromagnetic power 190 may also be used to adjust the transmission characteristics of the wireless access point 70. For example, if the electromagnetic power 190 is reduced or attenuated, the wireless access point 70 may need to increase the power of its transmissions to the communications device 20.

FIG. 21 illustrates a polarization 200 of the cellular impulse 80. When the cellular impulse 80 is transmitted, the polarization 200 of the cellular impulse 80 may indicate the orientation 150 of the communications device 20. The polarization 200 of the cellular impulse 80, and/or of the one or more reflections 30, may thus indicate the orientation 150 of the communications device 20. The reflection profile 32 may thus associate different polarizations 200 to different orientations 150 of the communications device 20. Once the polarization 200 is known (from either the cellular impulse 80 and/or the one or more reflections 30), the reflection profile 32 may be queried for the corresponding orientation 150 of the communications device 20.

The orientation 150 may be based on the polarization 200. Once the polarization 200 is known, the polarization 200 may be expressed as a vector. The orientation 150 may then be inferred from the vectorized polarization 200. The orientation 150, for example, may be perpendicular to the vectorized polarization 200. That is, once the polarization 200 is determined, the orientation 150 of the communications device 20 may be assumed to be perpendicular to the vectorized polarization 200. The orientation 150, however, may be parallel to the vectorized polarization 200. Once the polarization 200 is known, the user may be assumed to hold the communications device 20 parallel or perpendicular to the vector describing the polarization 200.

Figure 22:
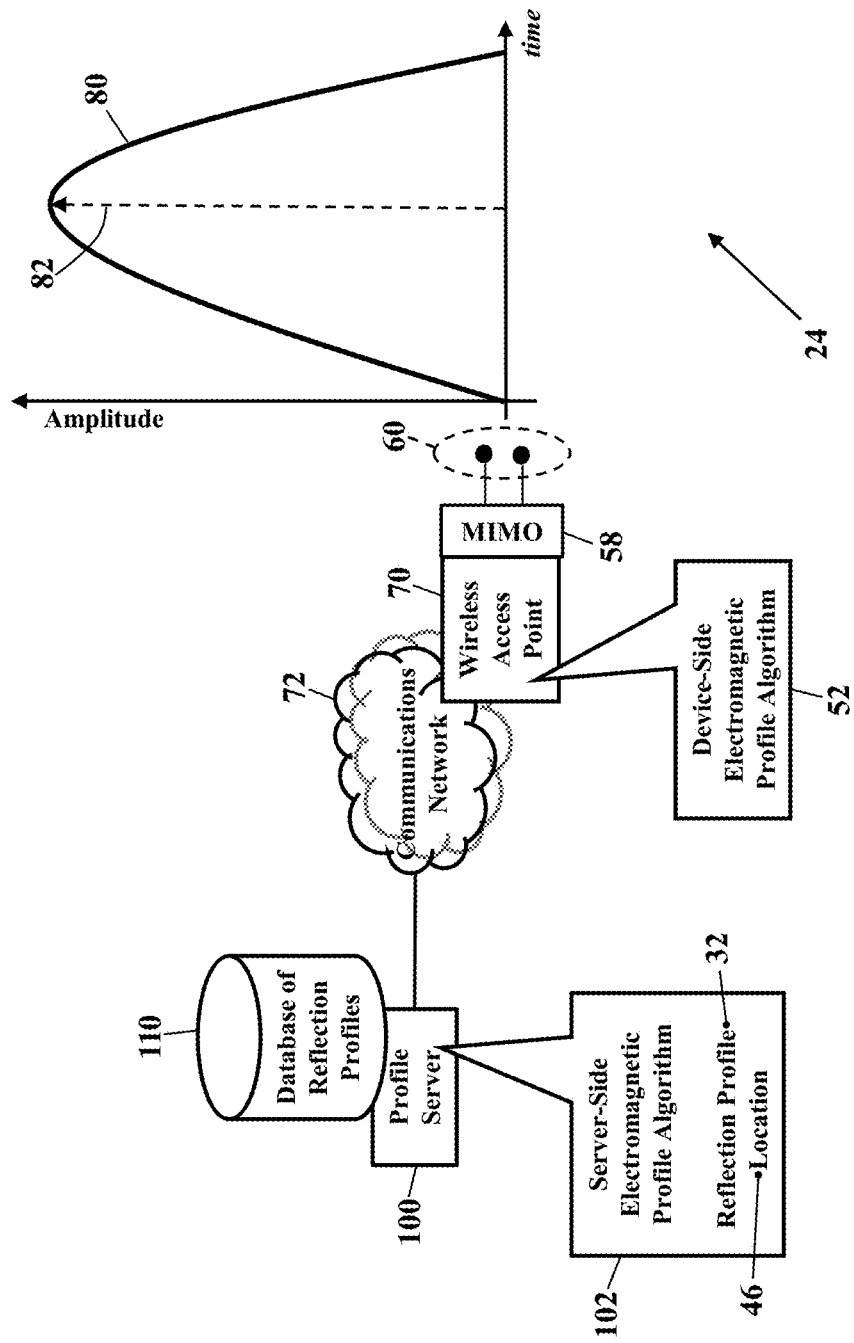
FIG. 22 is a schematic illustrating a cellular impulse, according to exemplary embodiments.

FIG. 22 is another schematic illustrating the cellular impulse 80, according to exemplary embodiments. Here, though, the cellular impulse 80 is transmitted by the wireless access point 70. There may be times or circumstances in which the wireless access point 70 wishes to evaluate the electromagnetic reflective characteristics of its ambient environment 24. The wireless access point 70 may thus transmit the cellular impulse 80 to develop the reflection profile 32 for its corresponding location 46. The profile server 100 may even order or command the wireless access point 70 to transmit the cellular impulse 80 (such as by the impulse command 140, as earlier explained). The database 110 of reflection profiles may thus store the reflection profile 32 generated by any device at any location 46. While the wireless access point 70 may evaluate the electromagnetic reflective characteristics using any frequency, the cellular frequencies are illustrated for simplicity.

Figure 23:
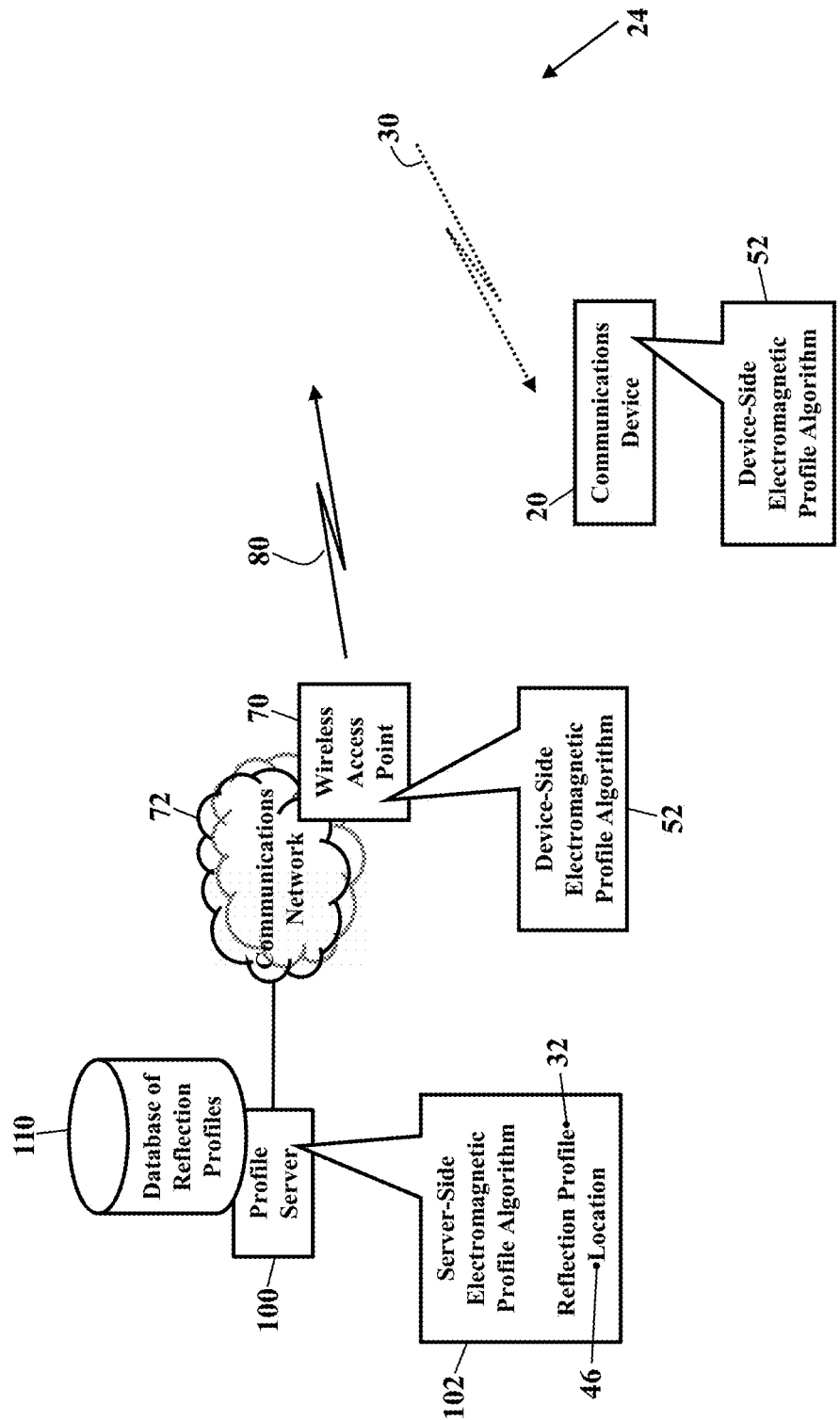
FIGS. 23-24 are more schematics illustrating the electromagnetic reflective characteristics of an ambient environment, according to exemplary embodiments.
Figure 24:
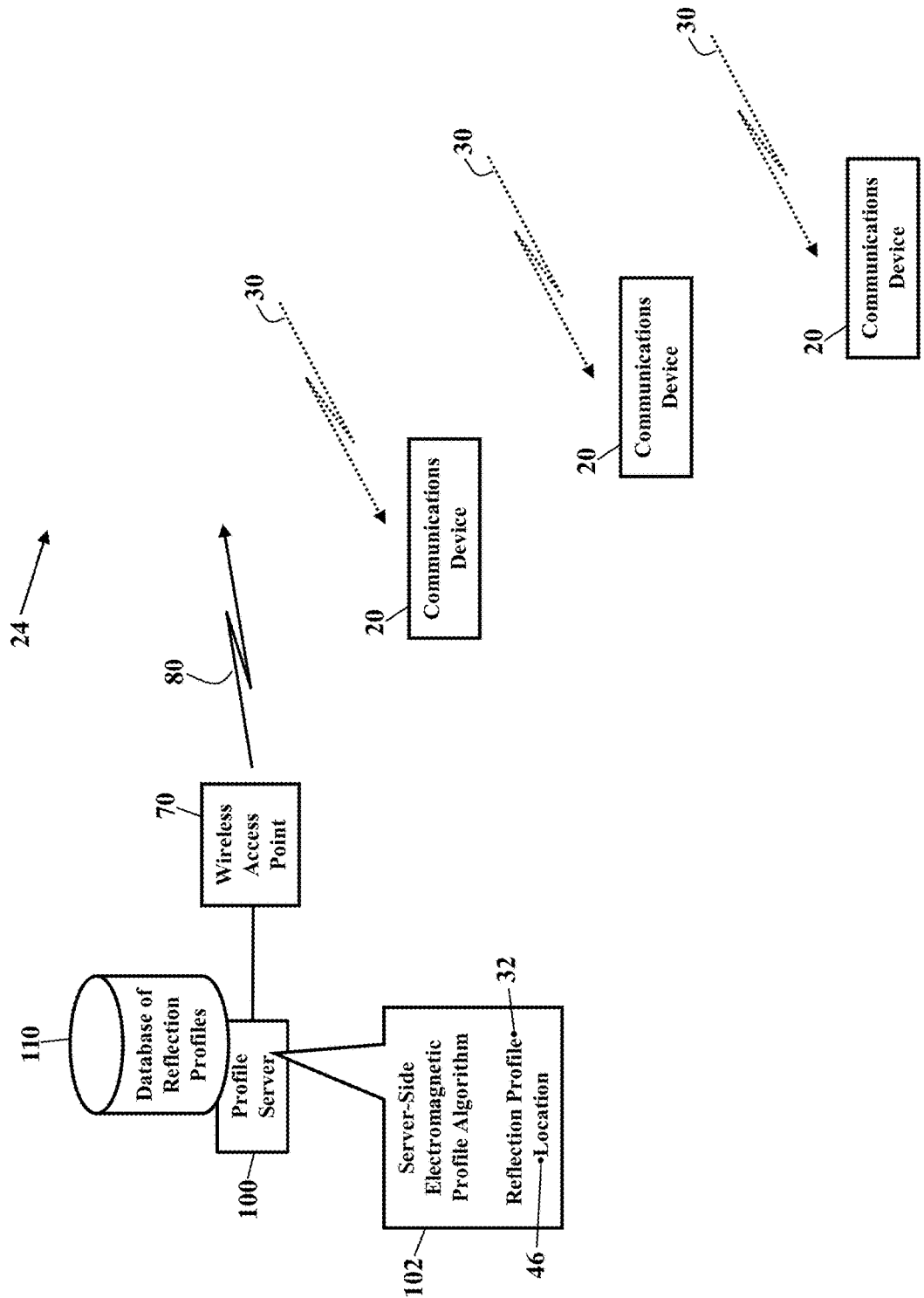

FIGS. 23-24 are more schematics illustrating the electromagnetic reflective characteristics of the ambient environment 24, according to exemplary embodiments. Here the wireless access point 70 may transmit the cellular impulse 80, but the reflections 30 are received by the communications device 20. The communications device 20 may thus upload information describing the reflections 30 to the profile server 100 for analysis. FIG. 23 thus illustrates that any communications devices 20 operating within range of the wireless access point 70 may evaluate the electromagnetic reflective characteristics of the ambient environment 24 without transmitting the cellular impulse 80. The profile server 100 may thus correlate transmission vectors to reception vectors to determine the reflection profile 32 associated with the location 46.

FIG. 24 illustrates how multiple communications devices 20 may receive the reflections 30. When the wireless access point 70 transmits the cellular impulse 80, there may be several communications devices 20 within reception range. The reflections 30 may thus be received by multiple communications devices 20, so the profile server 100 may receive multiple reflective uploads from different locations 46 within reception range. The profile server 100 may thus evaluate the electromagnetic reflective characteristics of the ambient environment 24 from multiple vantage points within range of the wireless access point 70.

Figure 25:
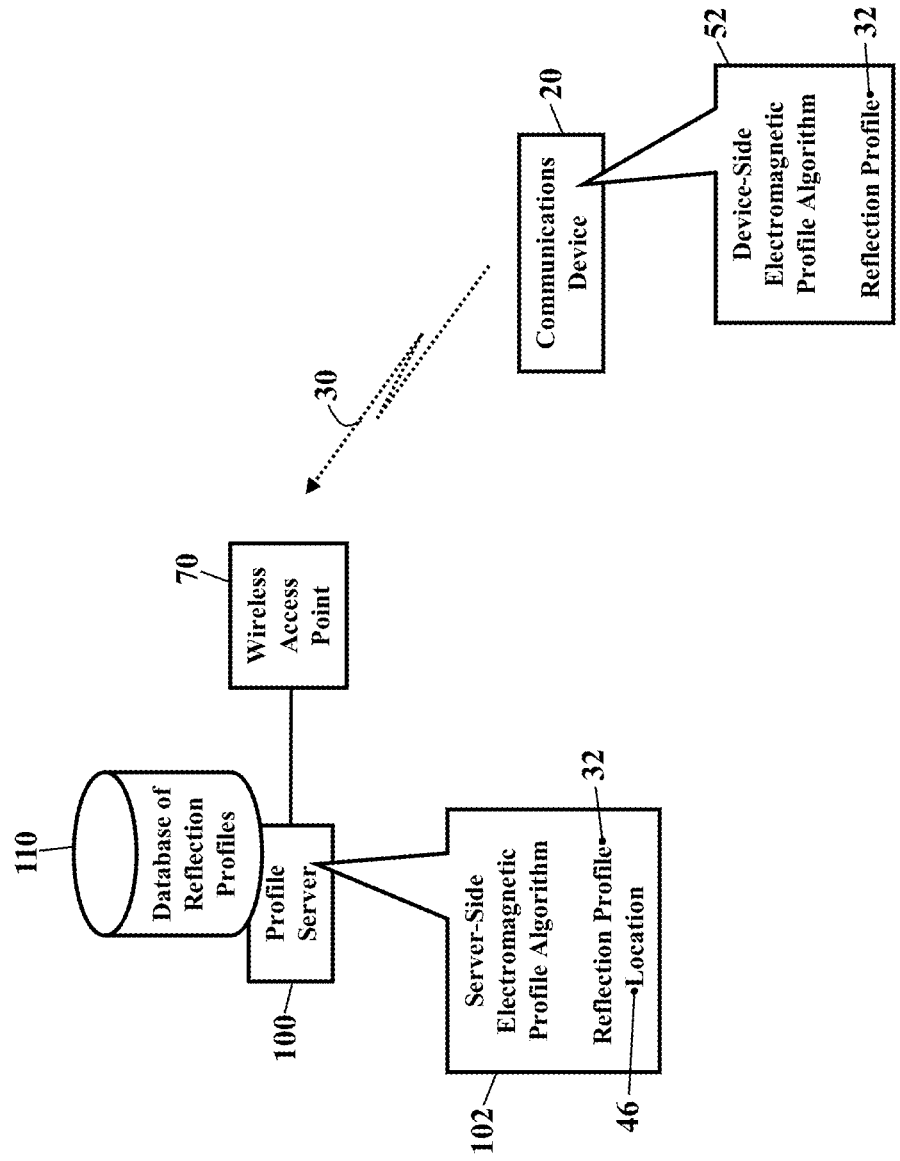
FIG. 25 is a schematic illustrating authentication, according to exemplary embodiments.

FIG. 25 is a schematic illustrating authentication, according to exemplary embodiments. Here the reflection profile 32 may be used to authenticate the communications device 20. When the communications device 20 requests some service via the wireless access point 70, some registration or authentication process may be required. If the communications device 20 presents or possesses the correct credentials, access to the wireless access point 70 is granted. Exemplary embodiments, then, may authenticate based on the reflection profile 32. The communications device 20, for example, may send some or all of the reflection profile 32 to the wireless access point 70. If the reflection profile 32 matches that stored in the database 110 of reflection profiles, then the wireless access point 70 may recognize and grant access. Should the reflection profile 32 be too large or complicated for quick analysis, the communications device 20 may only send a portion or summary parameters or values. Likewise, if bandwidth or congestion is a concern, the communications device 20 may only send the portion or summary parameters or values. Indeed, in actual practice, the reflection profile 32 may be reduced to only those features that are large with respect to a wavelength of the cellular impulse 80 and/or the reflections 30. These reduced features may allow the reflection profile 32 to be less dependent on "clutter" that would be hard to replicate.

The reflections 30 may also be used for authentication. When the communications device 20 requests access to the wireless access point 70, the communications device 20 may send the reflection 30 associated with the location 46. That is, the communications device 20 retrieves and sends a previous reflection 30 observed or received during a previous visit to the same location 46. Authentication, in other words, may be based on historical reflections 30 at the same location 46. If the communications device 20 sends an historical reflection 30 that matches that stored in the database 110 of reflection profiles, then the wireless access point 70 may recognize and grant access. Alternatively, if the profile server 100 can reconstruct and match the reflection profile 32 to that already stored in the database 110 of reflection profiles, then the profile server 100 and/or the wireless access point 70 may grant access. Here, then, the communications device 20 may detect its location 46 and automatically retrieve and send the historical reflection 30 previously received at the same location 46.

Figure 26:
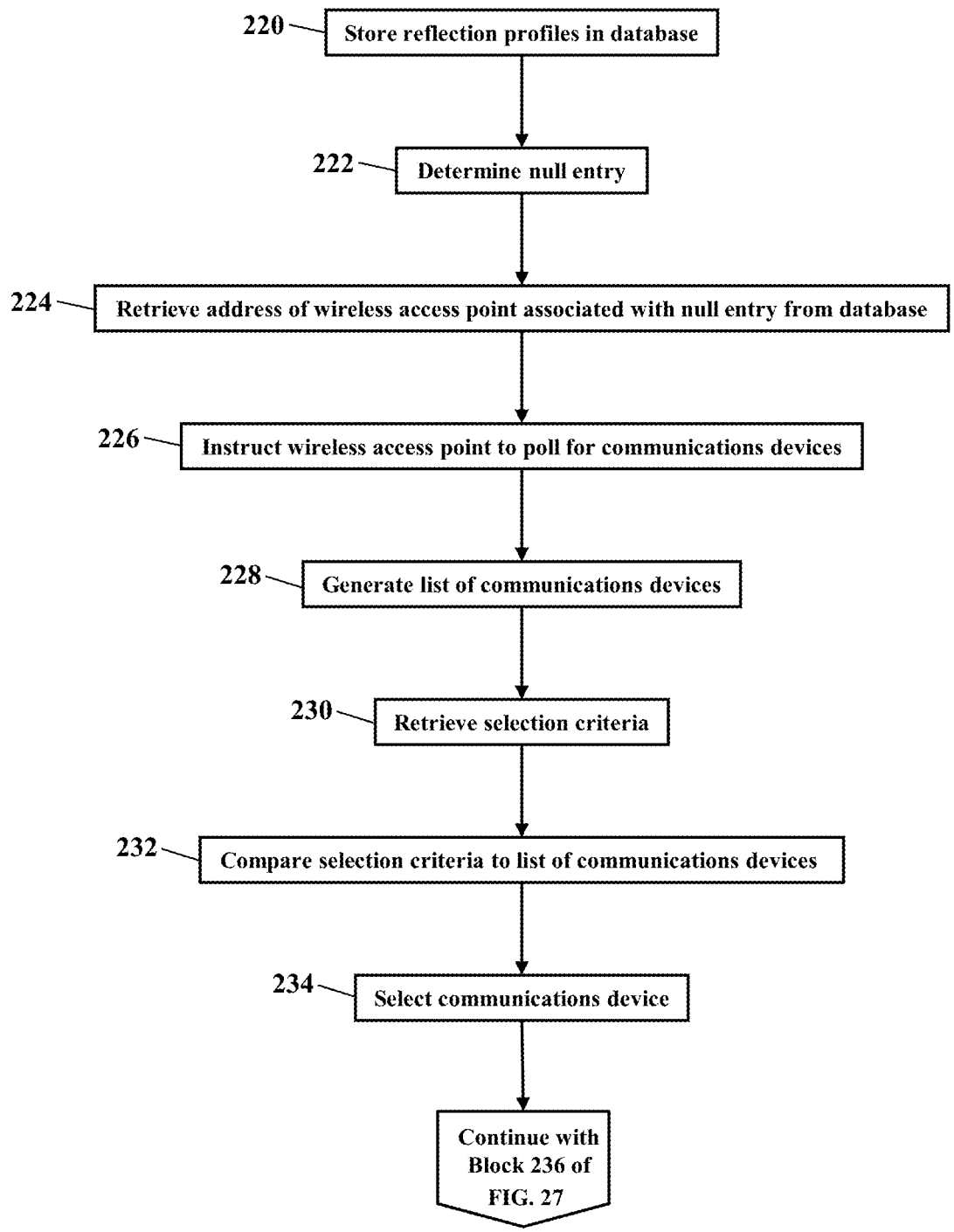
FIGS. 26-28 are flowcharts illustrating a method or algorithm for profiling electromagnetic characteristics, according to exemplary embodiments.
Figure 27:
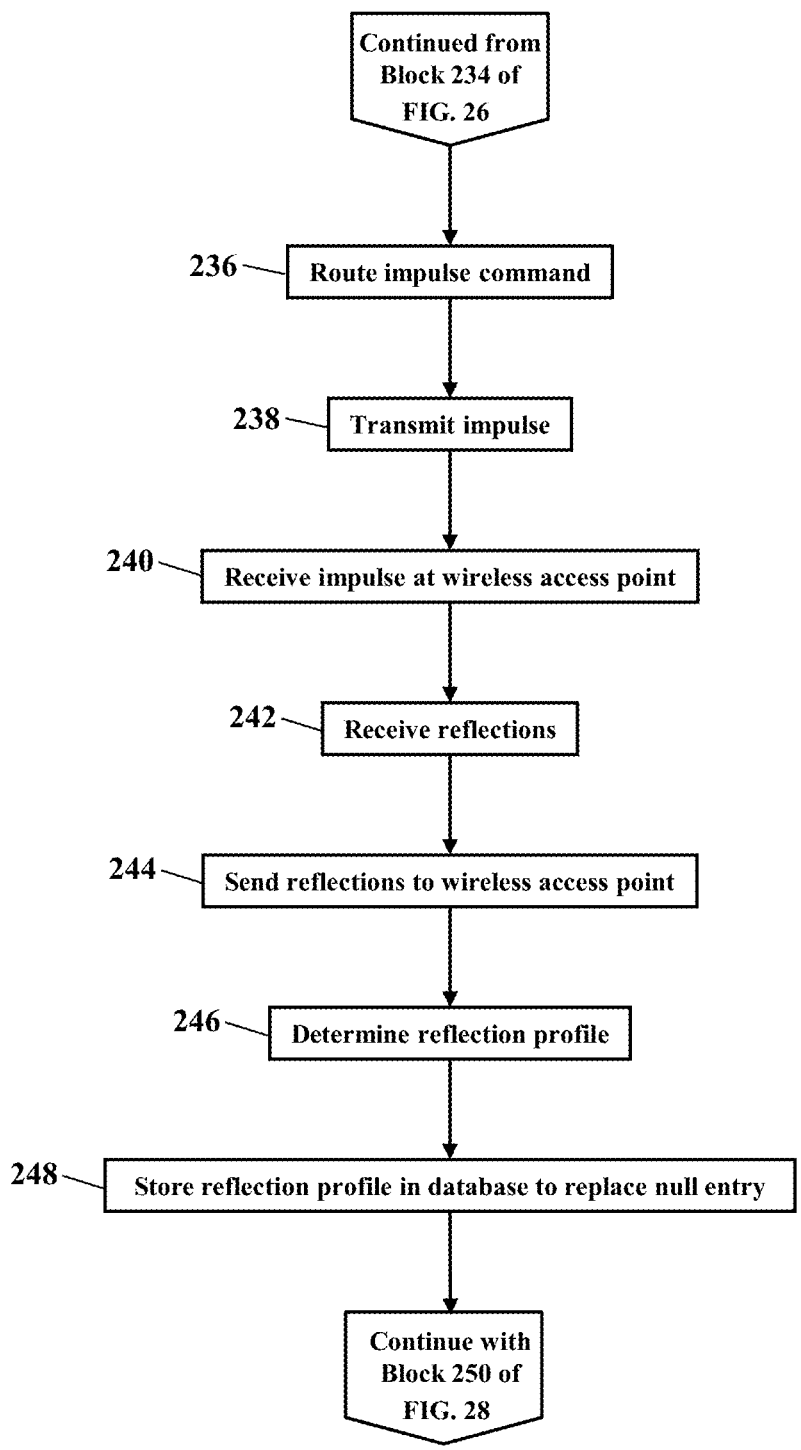
Figure 28:
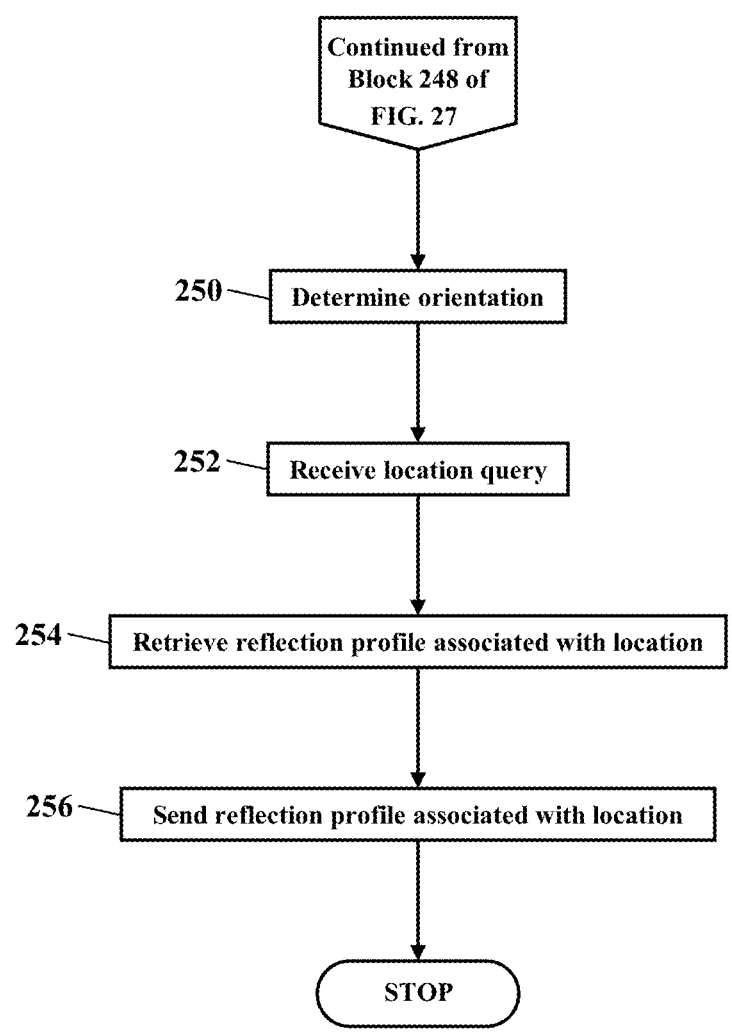

FIGS. 26-28 are flowcharts illustrating a method or algorithm for profiling electromagnetic characteristics, according to exemplary embodiments. Reflection profiles are stored in a database of reflection profiles (Block 220). A null entry is determined (Block 222). An address of a wireless access point associated with the null entry is retrieved from the database of reflection profiles (Block 224). The wireless access point is instructed to poll for communications devices (Block 226). A list of the communications devices is generated (Block 228). Selection criteria are retrieved (Block 230) and compared to the list of communications devices (Block 232). One of the communications devices is selected (Block 234).

The algorithm continues with FIG. 27. An impulse command is routed to the selected communications device (Block 236). An impulse is transmitted from the selected communications device (Block 238). The impulse is received at the wireless access point (Block 240). Reflections of the impulse are received at the selected communications device (Block 242). The reflections may be sent from the selected communications device to the wireless access point (Block 244). A reflection profile is determined (Block 246). The reflection profile is stored in the database of reflection profiles to replace the null entry (Block 248).

The algorithm continues with FIG. 28. The orientation 150 of the selected communications device is determined using the reflection profile (Block 250). A query is received from a requesting device that specifies a location (Block 252). The database of reflection profiles performs a look-up for the reflection profile associated with the location (Block 254). The reflection profile is sent as a response to the requesting device (Block 256).

Figure 29:
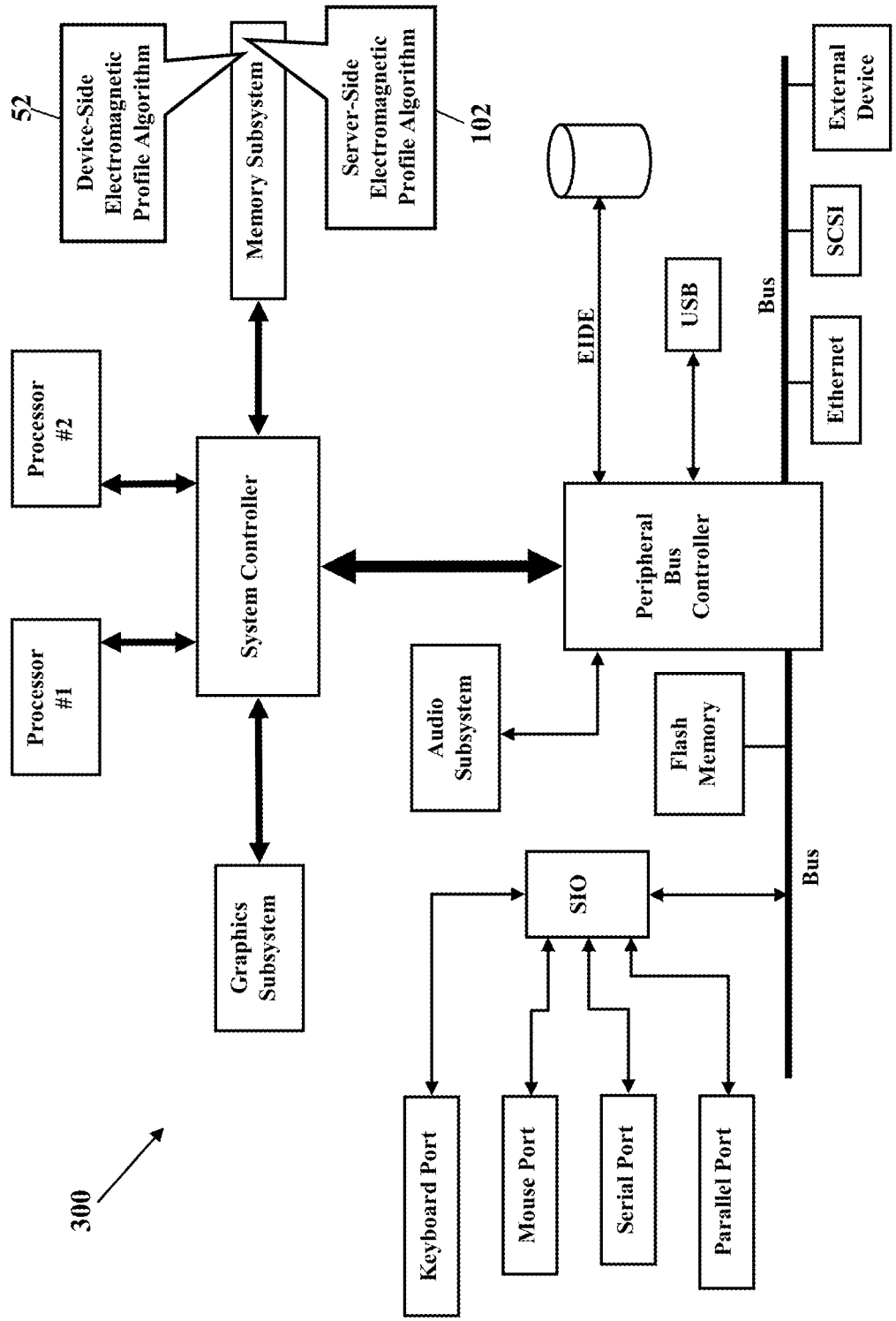

FIG. 29 is a schematic illustrating still more exemplary embodiments. FIG. 29 is a more detailed diagram illustrating a processor-controlled device 300. As earlier paragraphs explained, the device-side electromagnetic profile algorithm 52 and/or the server-side electromagnetic profile algorithm 102 may operate in any processor-controlled device. FIG. 29, then, illustrates the device-side electromagnetic profile algorithm 52 and/or the server-side electromagnetic profile algorithm 102 stored in a memory subsystem of the processor-controlled device 300. One or more processors communicate with the memory subsystem and execute either or both applications. Because the processor-controlled device 300 is well-known to those of ordinary skill in the art, no further explanation is needed.

Figure 30:
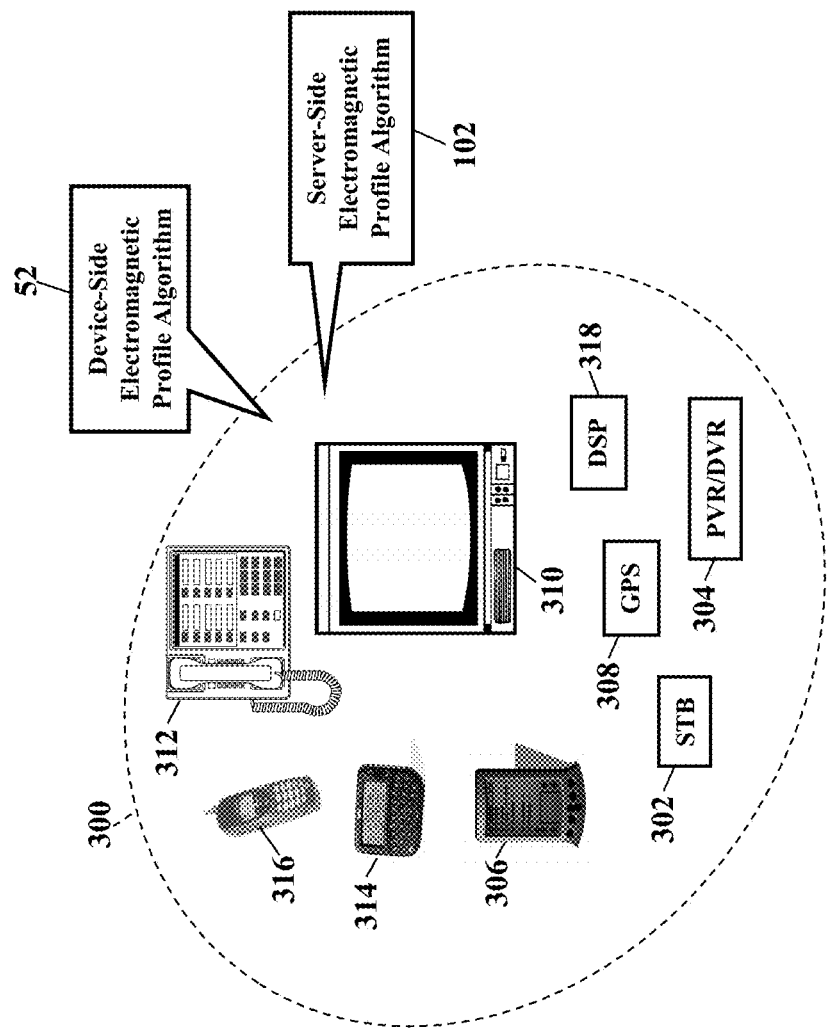

FIG. 30 depicts still more operating environments for additional aspects of the exemplary embodiments. FIG. 30 illustrates that the exemplary embodiments may alternatively or additionally operate within other processor-controlled devices 300. FIG. 30, for example, illustrates that the device-side electromagnetic profile algorithm 52 and/or the server-side electromagnetic profile algorithm 102 may entirely or partially operate within a set-top box ("STB") (302), a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system, communications device, or any processor-controlled device utilizing a digital signal processor (DP/DSP) 318. The processor-controlled device 300 may also include watches, radios, vehicle electronics, clocks, printers, gateways, mobile/implantable medical devices, and other apparatuses and systems. Because the architecture and operating principles of the various processor-controlled devices 300 are well known, the hardware and software componentry of the various processor-controlled devices 300 are not further shown and described.

Figure 31:
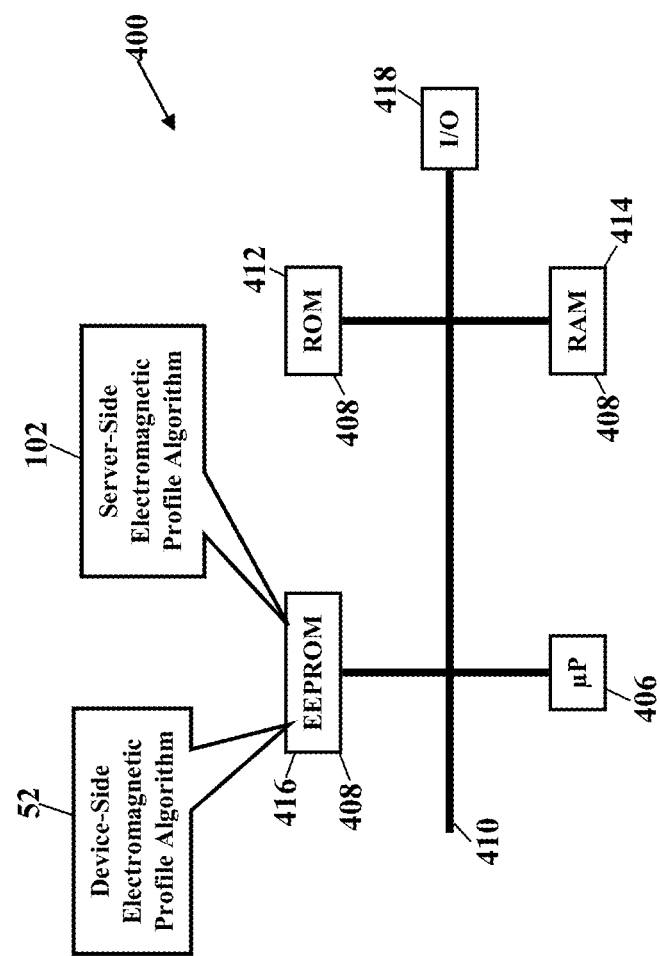

FIGS. 31-33 are schematics further illustrating various communications devices for presenting ring tones, according to exemplary embodiments. FIG. 31 is a block diagram of a subscriber identity module 400, while FIGS. 32 and 33 illustrate, respectively, the subscriber identity module 400 embodied in a plug 402 and in a card 404. As those of ordinary skill in the art recognize, the subscriber identity module 400 may be used in conjunction with the communications device (illustrated as reference numeral 20 in FIGS. 1-25). The subscriber identity module 400 stores user information and any portion of the device-side electromagnetic profile algorithm 52 and/or the server-side electromagnetic profile algorithm 102. As those of ordinary skill in the art also recognize, the plug 402 and the card 404 each interface with the communications device 20.

As FIG. 31 illustrates, the subscriber identity module 400 may be processor-controlled. A microprocessor 406 (µP) communicating with memory modules 408 via a data bus 410. The memory modules 408 may include Read Only Memory (ROM) 412, Random Access Memory (RAM) and or flash memory 414, and Electrically Erasable-Programmable Read Only Memory (EEPROM) 416. The subscriber identity module 400 stores some or all of the device-side electromagnetic profile algorithm 52 and/or the server-side electromagnetic profile algorithm 102 in one or more of the memory modules 408. FIG. 31 shows the device-side electromagnetic profile algorithm 52 and/or the server-side electromagnetic profile algorithm 102 residing in the Erasable-Programmable Read Only Memory 416. However, either algorithm may alternatively or additionally reside in the Read Only Memory 412 and/or the Random Access/Flash Memory 414. An Input/Output module 418 handles communication between the Subscriber Identity Module 300 and the communications device.

Figure 34:
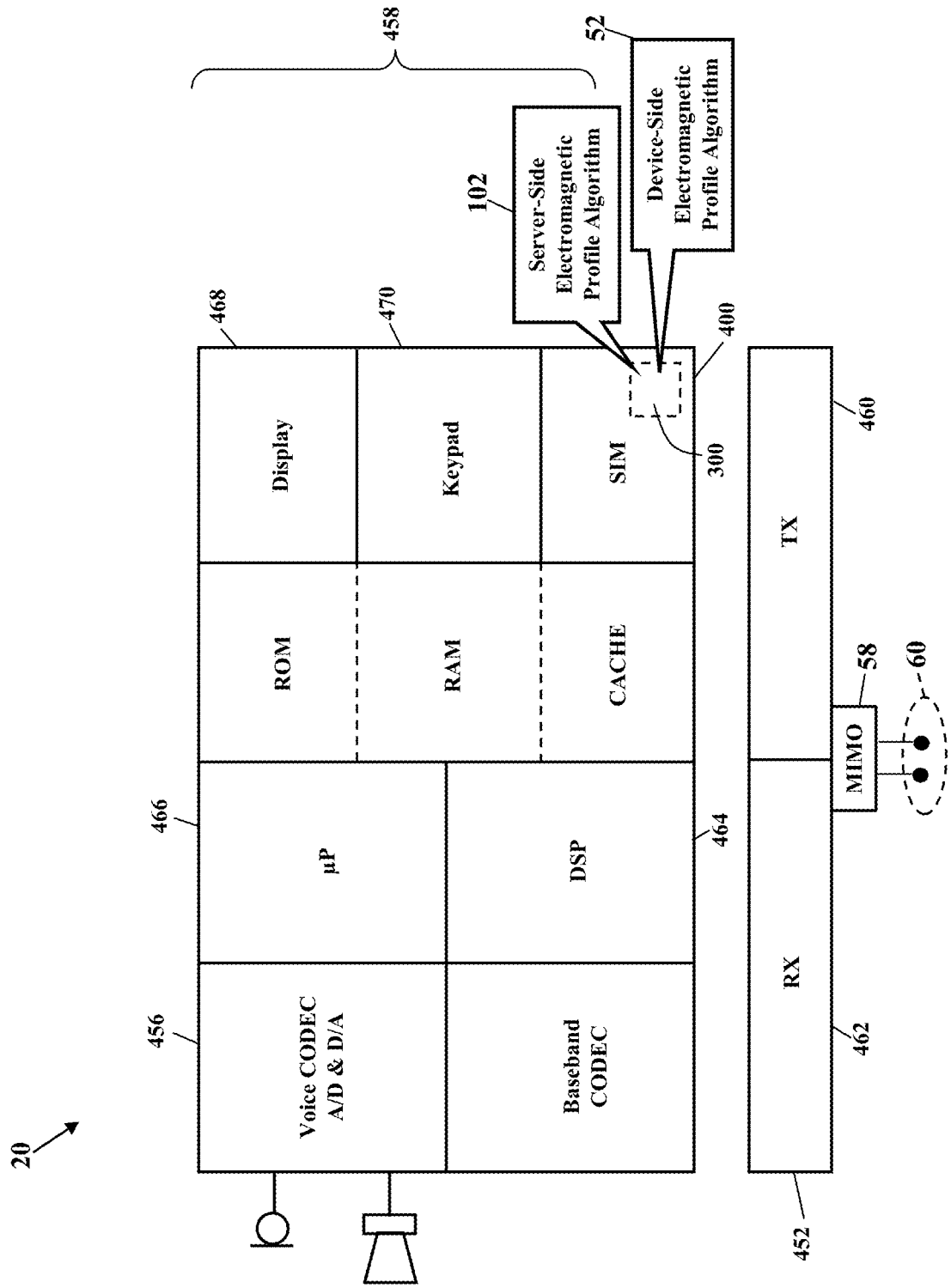

FIG. 34 is a block diagram further illustrating the communications device 20, according to exemplary embodiments. Here the communications device 20 may comprise a radio transceiver unit 452, an antenna 454, a digital baseband chipset 456, and a man/machine interface (MMI) 458. The transceiver unit 452 includes transmitter circuitry 460 and receiver circuitry 462 for receiving and transmitting radio-frequency (RF) signals. The transceiver unit 452 couples to the multiple input, multiple output ("MIMO") system 58 for converting electrical current to and from electromagnetic waves. The digital baseband chipset 456 may have a digital signal processor (DSP) 464 and performs signal processing functions for audio (voice) signals and RF signals. As FIG. 34 shows, the digital baseband chipset 456 may also include an on-board microprocessor 466 that interacts with the man/machine interface (MMI) 458. The man/machine interface (MMI) 458 may comprise a display device 468, a keypad 470, and the subscriber identity module 400. The on-board microprocessor 466 may perform TDMA, CDMA, GSM or other protocol functions and control functions. The on-board microprocessor 466 may also interface with the subscriber identity module 400 and with the device-side electromagnetic profile algorithm 52 and/or the server-side electromagnetic profile algorithm 102.

Exemplary embodiments may be applied to any signaling standard. As those of ordinary skill in the art recognize, FIGS. 31-33 may illustrate a Global System for Mobile (GSM) communications device. That is, the communications device may utilize the Global System for Mobile (GSM) communications signaling standard. Those of ordinary skill in the art, however, also recognize that exemplary embodiments are equally applicable to any communications device 20 utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, WI-FI®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for electromagnetic profiling of ambient environments, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
   receiving, by a server, a query from a smartphone reporting a location and requesting a reflection electromagnetic profile;
   determining, by the server, whether the reflection electromagnetic profile is unknown for the location reported by the smartphone; and
   in response to the reflection electromagnetic profile being unknown, determining, by the server, a wireless access point associated with the location reported by the smartphone.

2. The method of claim 1, further comprising retrieving the reflection electromagnetic profile.

3. The method of claim 1, further comprising responsive to determining that the reflection electromagnetic profile is known, receiving the reflection electromagnetic profile from the smartphone.

4. The method of claim 1, further comprising identifying the wireless access point by querying a database for the location.

5. The method of claim 1, further comprising responsive to determining that the reflection electromagnetic profile is known, transmitting the reflection electromagnetic profile.

6. The method of claim 1, further comprising responsive to determining that the reflection electromagnetic profile is known, transmitting the reflection electromagnetic profile to the smartphone.

7. The method of claim 1, further comprising responsive to determining that the reflection electromagnetic profile is known, sending the reflection electromagnetic profile to the smartphone via at least one of a cellular network and the wireless access point.

8. A system, comprising:
   a hardware processor; and
   a memory device, the memory device storing instructions, the instructions when executed causing the hardware processor to perform operations, the operations comprising:
   receiving a query from a smartphone reporting a location;
   determining whether a reflection electromagnetic profile is unknown for the location reported by the smartphone; and
   in response to the reflection electromagnetic profile being unknown, determining a wireless access point associated with the location reported by the smartphone.

9. The system of claim 8, wherein the operations further comprise retrieving the reflection electromagnetic profile.

10. The system of claim 8, wherein the operations further comprise in response to the reflection electromagnetic profile being known, sending the reflection electromagnetic profile to an address associated with the smartphone.

11. The system of claim 8, wherein the operations further comprise in response to the reflection electromagnetic profile being known, sending the reflection electromagnetic profile to an Internet protocol address associated with the wireless access point.

12. The system of claim 8, wherein the operations further comprise in response to the reflection electromagnetic profile being known, transmitting the reflection electromagnetic profile.

13. The system of claim 8, wherein the operations further comprise in response to the reflection electromagnetic profile being known, transmitting the reflection electromagnetic profile to the smartphone.

14. The system of claim 8, wherein the operations further comprise in response to the reflection electromagnetic profile being known, sending the reflection electromagnetic profile to the smartphone via at least one of a cellular network and a wireless local area network.

15. A memory device storing instructions that when executed cause a hardware processor to perform operations, the operations comprising:
   receiving a query from a smartphone reporting a location;
   determining whether a reflection electromagnetic profile is unknown for the location reported by the smartphone; and
   in response to the reflection electromagnetic profile being unknown, determining a wireless access point associated with the location reported by the smartphone.

16. The memory device of claim 15, wherein the operations further comprise retrieving the reflection electromagnetic profile.

17. The memory device of claim 15, wherein the operations further comprise in response to the reflection electromagnetic profile being known, sending the reflection electromagnetic profile to an address associated with the smartphone.

18. The memory device of claim 15, wherein the operations further comprise in response to the reflection electromagnetic profile being known, sending the reflection electromagnetic profile to an Internet protocol address associated with the smartphone.

19. The memory device of claim 15, wherein the operations further comprise in response to the reflection electromagnetic profile being known, transmitting the reflection electromagnetic profile.

20. The memory device of claim 15, wherein the operations further comprise in response to the reflection electromagnetic profile being known, transmitting the reflection electromagnetic profile to the smartphone.

* * * * *